US010536543B2

(12) United States Patent
Seth et al.

(10) Patent No.: US 10,536,543 B2
(45) Date of Patent: Jan. 14, 2020

(54) METHODS AND APPARATUS TO SHARE ONLINE MEDIA IMPRESSIONS DATA

(71) Applicant: The Nielsen Company (US), LLC, New York, NY (US)

(72) Inventors: Amitabh Seth, Saratoga, CA (US); Brahmanand Reddy Shivampet, Oak Park, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/974,472

(22) Filed: May 8, 2018

(65) Prior Publication Data

US 2018/0255151 A1     Sep. 6, 2018

Related U.S. Application Data

(63) Continuation of application No. 14/871,630, filed on Sep. 30, 2015, now Pat. No. 10,027,773, which is a (Continued)

(30) Foreign Application Priority Data

Apr. 12, 2013   (AU) .............................. 2013204865

(51) Int. Cl.
  *H04L 29/08*     (2006.01)
  *G06Q 30/02*     (2012.01)

(52) U.S. Cl.
  CPC ............. *H04L 67/22* (2013.01); *G06Q 30/02* (2013.01); *G06Q 30/0201* (2013.01); (Continued)

(58) Field of Classification Search
  CPC ......... H04L 67/02; H04L 67/22; H04L 67/30; H04L 67/304; G06Q 30/02; G06Q 30/0201; G06Q 30/0215; G06Q 30/0241
  See application file for complete search history.

(56) References Cited

U.S. PATENT DOCUMENTS 5,584,050 A   12/1996  Lyons
5,594,934 A   1/1997   Lu et al.
(Continued)

FOREIGN PATENT DOCUMENTS

CN      104520839      4/2015
EP      1379044        1/2004
(Continued)

OTHER PUBLICATIONS

Korean Intellectual Property Office, "Notice of Allowance", issued in connection with Korean Patent Application No. 10-2014-7034081, dated Jun. 2, 2016 (4 pages).
(Continued)

*Primary Examiner* — Ramy M Osman
(74) *Attorney, Agent, or Firm* — Hanley, Flight & Zimmerman, LLC

(57) ABSTRACT

Methods and apparatus to share online media impression data are disclosed. An example apparatus includes a communications interface; and a processor to generate instructions to be included in a web site and to cause the communications interface to provide the instructions to a web server associated with the web site, the instructions to cause a client, upon execution of the instructions, to initiate a process including sending a first request to an audience measurement entity; and sending a second request to cause a database proprietor to send to the audience measurement entity a cookie mapping of an audience measurement entity cookie to a database proprietor cookie corresponding to the client.

18 Claims, 18 Drawing Sheets

Related U.S. Application Data continuation of application No. 13/915,381, filed on Jun. 11, 2013, now Pat. No. 9,215,288.

(60) Provisional application No. 61/810,235, filed on Apr. 9, 2013, provisional application No. 61/658,233, filed on Jun. 11, 2012.

(52) U.S. Cl.
CPC .............. *H04L 67/02* (2013.01); *H04L 67/20* (2013.01); *H04L 67/2814* (2013.01)

(56) References Cited

U.S. PATENT DOCUMENTS

| | | | |
|---|---|---|---|
| 5,675,510 A | 10/1997 | Coffey et al. | |
| 5,796,952 A | 8/1998 | Davis et al. | |
| 5,832,520 A | 11/1998 | Miller | |
| 5,848,396 A | 12/1998 | Gerace | |
| 5,870,740 A | 2/1999 | Rose et al. | |
| 5,948,061 A | 9/1999 | Merriman et al. | |
| 6,035,339 A | 3/2000 | Agraharam et al. | |
| 6,052,730 A | 4/2000 | Felciano et al. | |
| 6,055,573 A | 4/2000 | Gardenswartz et al. | |
| 6,098,093 A | 8/2000 | Bayeh et al. | |
| 6,102,406 A | 8/2000 | Miles et al. | |
| 6,108,637 A | 8/2000 | Blumenau | |
| 6,138,155 A | 10/2000 | Davis et al. | |
| 6,141,694 A | 10/2000 | Gardner | |
| 6,223,215 B1 | 4/2001 | Hunt et al. | |
| 6,275,934 B1 | 8/2001 | Novicov | |
| 6,279,036 B1 | 8/2001 | Himmel et al. | |
| 6,286,140 B1 | 9/2001 | Ivanyi | |
| 6,415,323 B1 | 7/2002 | McCanne et al. | |
| 6,434,614 B1 | 8/2002 | Blumenau | |
| 6,457,010 B1 | 9/2002 | Eldering et al. | |
| 6,460,079 B1 | 10/2002 | Blumenau | |
| 6,529,952 B1 | 3/2003 | Blumenau | |
| 6,606,657 B1 | 8/2003 | Zilberstein et al. | |
| 6,658,410 B1 | 12/2003 | Sakamaki et al. | |
| 6,704,787 B1 | 3/2004 | Umbreit | |
| 6,714,917 B1 | 3/2004 | Eldering et al. | |
| 6,732,331 B1* | 5/2004 | Alexander | G06F 17/218 715/234 |
| 6,839,680 B1 | 1/2005 | Liu et al. | |
| 6,877,007 B1 | 4/2005 | Hentzel et al. | |
| 6,993,590 B1 | 1/2006 | Gauthier et al. | |
| 7,039,699 B1 | 5/2006 | Narin et al. | |
| 7,092,926 B2 | 8/2006 | Cerrato | |
| 7,139,723 B2 | 11/2006 | Conkwright et al. | |
| 7,146,329 B2 | 12/2006 | Conkwright et al. | |
| 7,150,030 B1 | 12/2006 | Eldering et al. | |
| 7,152,074 B2 | 12/2006 | Dettinger et al. | |
| 7,159,023 B2 | 1/2007 | Tufts | |
| 7,181,412 B1 | 2/2007 | Fulgoni et al. | |
| 7,260,837 B2 | 8/2007 | Abraham et al. | |
| 7,272,617 B1 | 9/2007 | Bayer et al. | |
| 7,302,447 B2 | 11/2007 | Dettinger et al. | |
| 7,343,417 B2 | 3/2008 | Baum | |
| 7,363,643 B2 | 4/2008 | Drake et al. | |
| 7,386,473 B2 | 6/2008 | Blumenau | |
| 7,406,516 B2 | 7/2008 | Davis et al. | |
| 7,546,370 B1 | 6/2009 | Acharya et al. | |
| 7,590,568 B2 | 9/2009 | Blumenau | |
| 7,613,635 B2 | 11/2009 | Blumenau | |
| 7,634,786 B2 | 12/2009 | Knee et al. | |
| 7,644,156 B2 | 1/2010 | Blumenau | |
| 7,647,418 B2 | 1/2010 | Ash et al. | |
| 7,650,407 B2 | 1/2010 | Blumenau | |
| 7,653,724 B2 | 1/2010 | Blumenau | |
| 7,925,694 B2 | 4/2011 | Harris | |
| 8,006,259 B2 | 8/2011 | Drake et al. | |
| 8,131,861 B2 | 3/2012 | Butler et al. | |
| 8,180,112 B2 | 5/2012 | Kurtz et al. | |
| 8,271,886 B2 | 9/2012 | Lee et al. | |
| 8,280,683 B2 | 10/2012 | Finkler | |
| 8,484,511 B2 | 7/2013 | Tidwell et al. | |
| 8,600,796 B1 | 12/2013 | Sterne et al. | |
| 8,688,524 B1 | 4/2014 | Ramalingam et al. | |
| 8,831,362 B1 | 9/2014 | Steffens | |
| 8,910,195 B1 | 12/2014 | Barney et al. | |
| 8,930,701 B2 | 1/2015 | Burbank et al. | |
| 8,954,536 B2* | 2/2015 | Kalus | G06Q 30/02 709/217 |
| 8,973,023 B1 | 3/2015 | Rao et al. | |
| 9,003,441 B1 | 4/2015 | Jindal et al. | |
| 9,055,021 B2 | 6/2015 | Heffernan et al. | |
| 9,055,122 B2 | 6/2015 | Grecco et al. | |
| 9,117,217 B2 | 8/2015 | Wilson et al. | |
| 9,135,655 B2 | 9/2015 | Buchalter et al. | |
| 9,215,288 B2* | 12/2015 | Seth | G06Q 30/0201 |
| 9,596,151 B2 | 3/2017 | Heffernan et al. | |
| 10,027,773 B2* | 7/2018 | Seth | H04L 67/20 |
| 2003/0037131 A1* | 2/2003 | Verma | H04L 67/22 709/223 |
| 2003/0065770 A1 | 4/2003 | Davis et al. | |
| 2003/0105604 A1 | 6/2003 | Ash et al. | |
| 2004/0107125 A1 | 6/2004 | Guheen et al. | |
| 2004/0167763 A1 | 8/2004 | Liebman | |
| 2004/0186840 A1 | 9/2004 | Dettinger et al. | |
| 2005/0166233 A1 | 7/2005 | Beyda et al. | |
| 2005/0223093 A1 | 10/2005 | Hanson et al. | |
| 2006/0074953 A1 | 4/2006 | Dettinger et al. | |
| 2006/0089754 A1 | 4/2006 | Mortenson | |
| 2007/0112714 A1 | 5/2007 | Fairweather | |
| 2008/0086523 A1 | 4/2008 | Afergan et al. | |
| 2008/0086741 A1 | 4/2008 | Feldman et al. | |
| 2008/0222201 A1 | 9/2008 | Chen et al. | |
| 2008/0235243 A1* | 9/2008 | Lee | G06F 16/9535 |
| 2009/0070797 A1 | 3/2009 | Ramaswamy et al. | |
| 2010/0070621 A1 | 3/2010 | Urdan et al. | |
| 2010/0088373 A1 | 4/2010 | Pinkham | |
| 2010/0153175 A1 | 6/2010 | Pearson et al. | |
| 2010/0161385 A1 | 6/2010 | Karypis et al. | |
| 2010/0211439 A1* | 8/2010 | Marci | G06Q 30/0201 705/7.29 |
| 2010/0281178 A1 | 11/2010 | Sullivan | |
| 2010/0312854 A1 | 12/2010 | Hyman | |
| 2011/0016482 A1 | 1/2011 | Tidwell et al. | |
| 2011/0041168 A1 | 2/2011 | Murray et al. | |
| 2011/0093327 A1* | 4/2011 | Fordyce, III | G06Q 30/02 705/14.39 |
| 2011/0131596 A1 | 6/2011 | Amsterdam et al. | |
| 2011/0157475 A1 | 6/2011 | Wright et al. | |
| 2011/0196735 A1 | 8/2011 | von Sydow et al. | |
| 2011/0213956 A1 | 9/2011 | Mukkara et al. | |
| 2011/0231240 A1* | 9/2011 | Schoen | H04L 67/22 705/14.41 |
| 2011/0276410 A1* | 11/2011 | Hjelm | G06Q 30/02 705/14.66 |
| 2012/0005213 A1 | 1/2012 | Hannan et al. | |
| 2012/0017094 A1* | 1/2012 | Tulchinsky | G06F 21/6263 713/182 |
| 2012/0072469 A1 | 3/2012 | Perez et al. | |
| 2012/0110027 A1 | 5/2012 | Falcon | |
| 2012/0116873 A1 | 5/2012 | Damm et al. | |
| 2012/0124202 A1* | 5/2012 | Cooper | H04L 67/14 709/224 |
| 2012/0136704 A1 | 5/2012 | Carlson et al. | |
| 2012/0206331 A1 | 8/2012 | Gandhi | |
| 2012/0215621 A1 | 8/2012 | Heffernan et al. | |
| 2012/0311017 A1 | 12/2012 | Sze et al. | |
| 2013/0007794 A1 | 1/2013 | Besehanic et al. | |
| 2013/0014144 A1 | 1/2013 | Bhatia et al. | |
| 2013/0019262 A1 | 1/2013 | Bhatia et al. | |
| 2013/0066713 A1 | 3/2013 | Umeda | |
| 2013/0086179 A1* | 4/2013 | Coleman | H04W 4/12 709/206 |
| 2013/0238745 A1 | 9/2013 | Ramachandran et al. | |
| 2013/0331971 A1 | 12/2013 | Bida et al. | |
| 2013/0332604 A1* | 12/2013 | Seth | G06Q 30/0201 709/224 |

(56) References Cited

U.S. PATENT DOCUMENTS

| | | | |
|---|---|---|---|
| 2013/0346172 A1* | 12/2013 | Wu | G06Q 30/0214 705/14.16 |
| 2014/0033317 A1 | 1/2014 | Barber | |
| 2014/0095702 A1* | 4/2014 | Kalus | H04L 67/22 709/224 |
| 2014/0108130 A1 | 4/2014 | Vos et al. | |
| 2014/0122703 A1 | 5/2014 | Pugh et al. | |
| 2014/0156761 A1 | 6/2014 | Heffernan et al. | |
| 2014/0164447 A1* | 6/2014 | Tarafdar | G06F 16/182 707/827 |
| 2014/0279074 A1 | 9/2014 | Chen et al. | |
| 2014/0298025 A1 | 10/2014 | Burbank et al. | |
| 2014/0324544 A1 | 10/2014 | Donato et al. | |
| 2014/0324545 A1 | 10/2014 | Splaine et al. | |
| 2014/0337104 A1 | 11/2014 | Splaine et al. | |
| 2015/0019322 A1 | 1/2015 | Alla et al. | |
| 2015/0019327 A1 | 1/2015 | Mazumdar et al. | |
| 2015/0046579 A1 | 2/2015 | Perez et al. | |
| 2015/0089354 A1* | 3/2015 | Abrahami | G06F 16/958 715/235 |
| 2015/0193816 A1 | 6/2015 | Toupet et al. | |
| 2015/0186403 A1 | 7/2015 | Srivastava et al. | |
| 2015/0189500 A1 | 7/2015 | Bosworth et al. | |
| 2015/0262207 A1 | 9/2015 | Rao et al. | |
| 2016/0021204 A1* | 1/2016 | Seth | G06Q 30/0201 709/224 |
| 2016/0275548 A1* | 9/2016 | Raman | G06Q 30/0246 |
| 2016/0359989 A1 | 12/2016 | Aycock | |
| 2018/0255151 A1* | 9/2018 | Seth | H04L 67/20 |

FOREIGN PATENT DOCUMENTS

| | | |
|---|---|---|
| JP | 2003067289 | 3/2003 |
| JP | 2008234641 | 10/2008 |
| JP | 2012093970 | 5/2012 |
| WO | 9809447 | 3/1998 |
| WO | 0154034 | 7/2001 |
| WO | 2010083450 | 7/2010 |
| WO | 2012040371 | 3/2012 |
| WO | 2013188429 | 12/2013 |

OTHER PUBLICATIONS

Japanese Patent Office, "Notice of Reasons for Rejection," issued in connection with Japanese Patent Application No. 2015-516283, dated Jan. 19, 2016, 8 pages.

European Patent Office, "Extended European Search Report," issued in connection with European Patent Application No. 13803850.0, dated Dec. 9, 2015, 8 pages.

Canadian Intellectual Property Office, "Office Action," issued in connection with Canadian Patent Application No. 2,875,210, dated Jan. 15, 2016, 4 pages.

Korean Patent Office, "Notice of Preliminary Rejection," issued in connection with Korean Patent Application No. 10-2014-7034081, dated Nov. 13, 2015, 13 pages.

IP Australia, "Patent Examination Report No. 1," issued in connection with Australian Patent Application No. 2015230772, dated Apr. 27, 2016, 3 pages.

Patent Cooperation Treaty, "International Search Report and Written Opinion of the International Searching Authority," issued by the International Searching Authority in connection with PCT/US2013/045211, dated Feb. 25, 2014, 13 pages.

Patent Cooperation Treaty, "International Preliminary Report on Patentability," issued in connection with Application No. PCT/US2013/045211, dated Dec. 16, 2014, 8 pages.

IP Australia, "Patent Examination Report No. 1," issued in connection with Application No. 2013204865, dated Dec. 22, 2014, 3 pages.

United States Patent and Trademark Office, "Non-Final Office Action," issued in connection with U.S. Appl. No. 13/915,381, dated Jan. 30, 2015, 51 pages.

United States Patent and Trademark Office, "Notice of Allowance," issued in connection with U.S. Appl. No. 13/915,381, dated Jun. 8, 2015, 44 pages.

IP Australia, "Notice of Acceptance," issued in connection with Application No. 2013204865, dated Jun. 30, 2015, 2 pages.

The State Intellectual Property Office of China, "Second Office Action," issued in connection with application No. 201380029272.8 dated Feb. 4, 2017, 24 pages.

Japanese Patent Office, "Notice of Allowance," issued in connection with Japanese Patent Application No. 2015-516283, dated Apr. 29, 2017, 3 pages.

IP Australia, "Notice of Acceptance," issued in connection with application No. 2015230772, dated Sep. 21, 2016, 2 pages.

Canadian Intellectual Property Office, "Office Action," issued in connection with application No. 2,875,210, dated Dec. 8, 2016, 4 pages.

The State Intellectual Property of China, "First Office Action," issued in connection with application No. 201380029272.8 dated Jul. 22, 2016, 20 pages.

IP Australia, "Certificate of Grant," issued in connection with application No. 2015230772, dated Jan. 19, 2017, 1 page.

Korean Intellectual Property Office, "Notice of Preliminary Rejection," issued in connection with application No. 10-2016-7024066, dated Nov. 8, 2016, 8 pages.

Japanese Patent Office, "Notice of Reasons for Rejection," issued in connection with application No. 2015-516283, dated Nov. 15, 2016, 10 pages.

Korean Intellectual Property Office, "Notice of Allowance," issued in connection with application No. 10-2016-7024066, dated Jan. 26, 2017, 3 pages.

Nielsen, "How Teens Use Media: A Nielsen Report on the Myths and Realities of Teen Media Trends," Jun. 2009, 17 pages.

Arbitron Inc., Edison Research, "The Infinite Dial 2011: Navigating Digital Platforms," 2011, 83 pages.

Rust et al., "A Comparative Study of Television Duplication Models," Journal for Advertising, vol. 10, No. 3, 1981, 6 pages.

Edwards, Jim. "Apple Wants More Advertisers to Use Its iPhone Tracking System." Business Insider. Jun. 13, 2013. Retrieved from <http://www.businessinsider.com/apples-idfa-and-ifa-tracking-system-20-13-6>on Jul. 24, 2014. 2 pages.

Patent Cooperation Treaty, "International Search Report and Written Opinion of the International Searching Authority," issued in connection with Application No. PCT/US2014/031342, dated Jul. 28, 2014, 13 pages.

Facebook for Business. "Measuring Conversions on Facebook, Across Devices and in Mobile Apps" Aug. 14, 2014. Retrieved from <https://www.facebook.com/business/news/cross-device-measurement> on Aug. 14, 2014. 3 pages.

Japanese Patent Office, "Office Action" with English translation, issued in connection with application No. JP 2013-544887, dated Aug. 12, 2014, 21 pages.

Patent Cooperation Treaty, "International Search Report," issued in connection with Application No. PCT/US2014/035156, dated Aug. 25, 2014, 5 pages.

Patent Cooperation Treaty, "Written Opinion," issued in connection with Application No. PCT/US2014/035156, dated Aug. 25, 2014, 5 pages.

Patent Cooperation Treaty, "International Search Report and Written Opinion of the International Searching Authority," issued in connection with Application No. PCT/US2014/034389, dated Sep. 5, 2014, 15 pages.

European Patent Office, "Extended European Search Report," issued in connection with application No. EP 12760524.4, dated Aug. 18, 2014, 8 pages.

Patent Cooperation Treaty, "International Search Report and Written Opinion," issued in connection with Application No. PCT/US2014/035683, dated Sep. 12, 2014, 13 pages.

Patent Cooperation Treaty, "International Search Report and Written Opinion," issued in connection with Application No. PCT/US2014/037064, dated Sep. 12, 2014, 9 pages.

Adam et al., "Privacy Preserving Integration of Health Care Data," AMIA 2007 Symposium Proceedings, 6 pages.

(56) References Cited

OTHER PUBLICATIONS

IP Australia, "Examination Report," issued in connection with application No. AU 2013205736, dated Jun. 18, 2013, 2 pages.
Albanesius, "Facebook Issues Fix for Several Tracking Cookies," <www.pcmag.com>, Sep. 28, 2011, 2 pages.
Protalinski, "Facebook denies cookie tracking allegations," <www.zdnet.com>, Sep. 25, 2011, 2 pages.
Protalinski, "Facebook fixes cookie behavior after logging out," <www.zdnet.com,> Sep. 27, 2011, 2 pages.
Protalinski, "US congressmen ask FTC to investigate Facebook cookies," <www.zdnet.com>, Sep. 28, 2011, 2 pages.
Fliptop, "Fliptop Person API Documentation," <https://developer.fliptop.com/documentation>, retrieved on May 7, 2013, 6 pages.
Fliptop, "Get, Keep and Grow Customers with Fliptop's Customer Intelligence Application," <www.fliptop.com/features#social_matching>, retrieved on May 7, 2013 , 3 pages.
Fliptop, "What is Fliptop?", www.fliptop.com/about_us, retrieved on May 7, 2013, 1 page.
International Bureau, "International Preliminary Report on Patentability," issued in connection with PCT application Serial No. PCT/US2011/052623, dated Mar. 26, 2013, 5 pages.
International Searching Authority, "International Preliminary Report on Patentability," issued in connection with application No. PCT/US2012/026760, dated Sep. 24, 2013, 4 pages.
International Searching Authority, "International Search Report," issued in connection with application No. PCT/US2011/052623, dated Mar. 8, 2012, 3 pages.
International Searching Authority, "International Search Report," issued in connection with application No. PCT/US2012/026760, dated Jan. 2, 2013, 3 pages.
International Searching Authority, "International Search Report," issued in connection with International Application No. PCT/US2013/025687 dated Jun. 2, 2013, 5 pages.
International Searching Authority, "Written Opinion of the International Searching Authority," issued in issued in connection with International Application No. PCT/US2013/025687 dated Jun. 2, 2013, 5 pages.
International Searching Authority, "Written Opinion," issued in connection with application No. PCT/US2011/052623, dated Mar. 8, 2012, 4 pages.
International Searching Authority, "Written Opinion," issued in connection with application No. PCT/US2011/065881, dated Jul. 9, 2012, 6 pages.
International Searching Authority, "Written Opinion," issued in connection with application No. PCT/US2012/026760, dated Jan. 2, 2013, 3 pages.
Javascript and Ajax Forum, Sep. 28, 2005, http://www.webmasterworld.com/forum91/4465.htm, retrieved on Jun. 29, 2011, 4 pages.
Launder, "Media Journal: Nielsen to Test Online—TV Viewing Tool," The Wall Street Journal, Apr. 30, 2013, 2 pages.
Mental Poker, Wikipedia, Jan. 12, 2010, <http://en.wikipedia.org/wiki/Mental_poker>, retrieved on Sep. 21, 2010, 5 pages.
The Nielsen Company, "Nielsen Unveils New Online Advertising Measurement," Sep. 27, 2010, <retrieved from Internet at http://nielsen.com/us/en/insights/press-room/2010/nielsen_unveils_newonlineadvertisingmeasurement.html>, on May 31, 2012, 3 pages.
Cubrilovic, "Logging out of Facebook is not enough," <www.nikcub.appspot.com>, Sep. 25, 2011, 3 pages.
Patent Cooperation Treaty, "International Search Report," issued by the International Searching Authority in connection with PCT application No. PCT/US2011/065881, dated Jul. 9, 2012, 3 pages.
Rapleaf, "Fast. Simple. Secure," www.rapleaf.com/why-rapleaf/, retrieved on May 7, 2013, 3 pages.
Rapleaf, "Frequently Asked Questions," www.rapleaf.com/about-us/faq/#where, retrieved on May 7, 2013, 3 pages.
IP Australia, "Patent Examination Report No. 1," issued in connection with application No. 2011305429 dated Apr. 17, 2014, 4 pages.
The State Intellectual Property Office of China, "First Notification of Office Action," issued in connection with Application No. 201180061437.0, dated Mar. 7, 2014, 11 pages.

The State Intellectual Property Office of China, "Second Notification of Office Action," issued in connection with Application No. 201180061437.0, dated Nov. 15, 2014, 6 pages.
IP Australia, "Patent Examination Report No. 1," issued in connection with Application No. 2011374955, dated Sep. 25, 2014, 3 pages.
Canadian Intellectual Property Office, "Examination Search Report," issued in connection with Application No. 2,873,128, dated Jan. 7, 2015, 3 pages.
Patent Cooperation Treaty, "International Search Report," issued by the International Searching Authority in connection with PCT Application No. PCT/US2014/068165, dated Feb. 25, 2015, 3 pages.
Patent Cooperation Treaty, "Written Opinion of the International Searching Authority," issued in connection with PCT Application No. PCT/US2014/068165, dated Feb. 25, 2015, 5 pages.
United States Patent and Trademark Office, "Non-Final Office Action," issued in connection with U.S. Appl. No. 13/756,493, dated Nov. 19, 2014, 13 pages.
Canadian Intellectual Property Office, "Office Action," issued in connection with Canadian Patent Application No. 2,810,264, dated Nov. 27, 2014, 5 pages.
IP Australia, "Examination Report No. 2," issued in connection with application No. AU 2012231667, dated Feb. 10, 2015, 3 pages.
United States Patent and Trademark Office, "Notice of Allowance," issued in connection with U.S. Appl. No. 13/756,493, dated Mar. 17, 2015, 15 pages.
Patent Cooperation Treaty, "International Search Report," issued by the International Searching Authority in connection with PCT application No. PCT/US2014/068168, dated Mar. 2, 2015, 3 pages.
Patent Cooperation Treaty, "Written Opinion of the International Searching Authority," issued in connection with PCT application No. PCT/US2014/068168, dated Mar. 2, 2015, 5 pages.
Patent Cooperation Treaty, "International Preliminary Report on Patentability," issued in connection with Application No. PCT/US2013/057045, dated Mar. 3, 2015, 1 page.
Patent Cooperation Treaty, "International Search Report," issued in connection with Application No. PCT/US2014/068623, dated Mar. 23, 2015, 3 pages.
Patent Cooperation Treaty, "Written Opinion," issued in connection with Application No. PCT/US2014/068623, dated Mar. 23, 2015, 8 pages.
Patent Cooperation Treaty, "International Search Report," issued in connection with Application No. PCT/US2014/068202, dated Apr. 10, 2015, 3 pages.
Patent Cooperation Treaty, "Written Opinion," issued in connection with Application No. PCT/US2014/068202, dated Apr. 10, 2015, 7 pages.
Google Answers, "Storing and Retrieving non 3rd Party Cookies Across Multiple Domains," Jun. 30, 2006, retrieved from <http://answers.google.com/answers/threadview/id/742376.html>, 4 pages.
State Intellectual Property Office of China, "Office Action," issued in connection with Chinese Patent Application No. 201380029272.8, dated Aug. 15, 2017, 22 pages.
IP Australia, "Examination Report No. 1," issued in connection with Australian Patent Application No. 2017200060, dated Nov. 22, 2017, 3 pages.
Canadian Intellectual Property Office, "Office Action," issued in connection with Canadian Patent Application No. 2,875,210, dated Nov. 21, 2017, 4 pages.
Pouttu-Clarke, "J2EE patterns: Cross Domain Cookie Provider," The Server Side, Jan. 19, 2005, <http://www.theserverside.com/discussions/thread/31258.html>, 12 pages.
United States Patent and Trademark Office, "Restriction Requirement", issued in connection with U.S. Appl. No. 13/915,381, dated Oct. 8, 2014, 6 pages.
IP Australia, "Examination report No. 2 for standard patent application," issued in connection with Australian Patent Application No. 2017200060, dated Apr. 4, 2018, 3 pages.
United States Patent and Trademark Office, "Supplemental Notice of Allowability," issued in connection with U.S. Appl. No. 14/871,630, dated May 15, 2018, 2 pages.

(56) References Cited

OTHER PUBLICATIONS

United States Patent and Trademark Office, "Corrected Notice of Allowance," issued in connection with U.S. Appl. No. 14/871,630, dated Feb. 9, 2018, 4 pages.

United States Patent and Trademark Office, "Supplemental Notice of Allowability," issued in connection with U.S. Appl. No. 14/871,630, dated Jan. 31, 2018, 2 pages.

United States Patent and Trademark Office, "Notice of Allowance," issued in connection with U.S. Appl. No. 14/871,630, dated Jan. 18, 2018, 5 pages.

United States Patent and Trademark Office, "Notice of Allowance," issued in connection with U.S. Appl. No. 14/871,630, dated Jun. 8, 2017, 8 pages.

United States Patent and Trademark Office, "Non-Final Office Action," issued in connection with U.S. Appl. No. 14/871,630, dated Feb. 9, 2017, 8 pages.

* cited by examiner

METHODS AND APPARATUS TO SHARE ONLINE MEDIA IMPRESSIONS DATA

RELATED APPLICATIONS

This patent arises from a divisional of U.S. patent application Ser. No. 14/871,630, filed on Sep. 30, 2015, entitled "METHODS AND APPARATUS TO SHARE ONLINE MEDIA IMPRESSION DATA," which is a continuation of U.S. patent application Ser. No. 13/915,381, filed on Jun. 11, 2013, entitled "METHODS AND APPARATUS TO SHARE ONLINE MEDIA IMPRESSION DATA," which claims priority to U.S. Provisional Patent Application Ser. No. 61/658,233, filed Jun. 11, 2012, entitled "METHODS AND APPARATUS TO SHARE ONLINE MEDIA IMPRESSIONS DATA," to U.S. Provisional Patent Application Ser. No. 61/810,235, filed Apr. 9, 2013, entitled "METHODS AND APPARATUS TOA SHARE ONLINE MEDIA IMPRESSION DATA," and to Australian Patent Application Serial No. 2013204865, filed Apr. 12, 2013, entitled "METHODS AND APPARATUS TO SHARE ONLINE MEDIA IMPRESSIONS DATA." The entireties of U.S. patent application Ser. Nos. 14/871,630, 13/915,381, U.S. Provisional Patent Application Ser. No. 61/658,233, U.S. Provisional Patent Application Ser. No. 61/810,235, and Australian Patent Application Serial No. 2013204865 are incorporated herein by reference.

FIELD OF THE DISCLOSURE

The present disclosure relates generally to monitoring media and, more particularly, to methods and apparatus to determine impressions using distributed demographic information.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media programs (e.g., television programs or radio programs, movies, DVDs, etc.) exposed to those panel members. In this manner, the audience measurement entity can determine exposure measures for different media content based on the collected media measurement data.

Techniques for monitoring user access to Internet resources such as web pages, advertisements and/or other content has evolved significantly over the years. Some known systems perform such monitoring primarily through server logs. In particular, entities serving content on the Internet can use known techniques to log the number of requests received for their content at their server.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
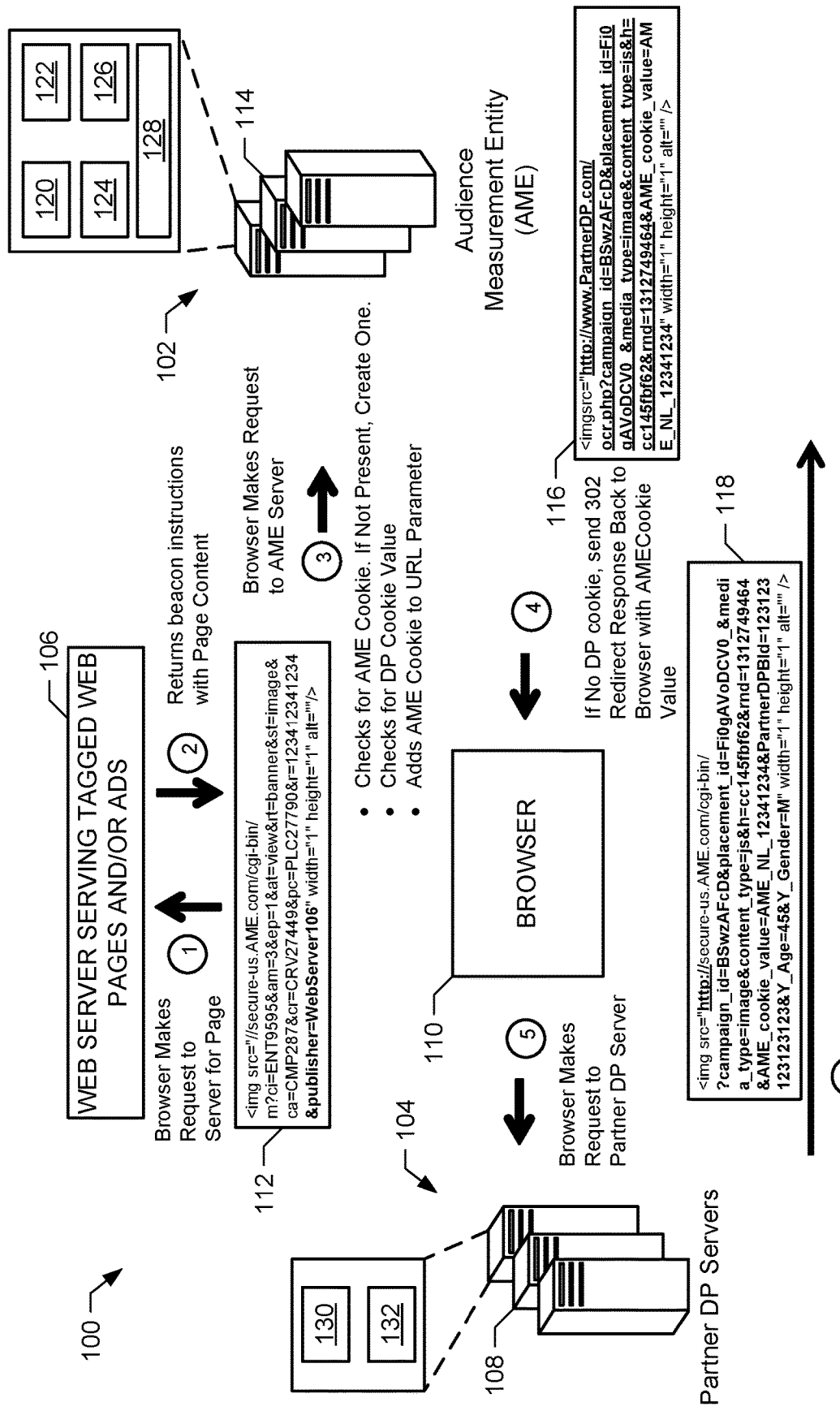
FIG. 1 depicts an example system to generate an audience measurement entity (AME)-to-partner cookie mapping based on a re-direct from the AME to a partner database proprietor (DP).

Techniques for monitoring user access to Internet resources such as web pages, content, advertisements and/or other media have evolved significantly over the years. At one point in the past, such monitoring was done primarily through server logs. In particular, entities serving media (e.g., content and/or advertisements) on the Internet would log the number of requests received for their media at their server. Basing Internet usage research on server logs is problematic for several reasons. For example, server logs can be tampered with either directly or via zombie programs which repeatedly request media from the server to increase the server log counts. Secondly, media is sometimes retrieved once, cached locally and then repeatedly viewed from the local cache without involving the server in the repeat viewings. Server logs cannot track these views of cached media. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media (e.g., content and/or advertisements) to be tracked is tagged with beacon instructions. In particular, monitoring instructions are associated with the HTML of the media to be tracked. When a client requests the media, both the media and the beacon instructions are downloaded to the client. The beacon instructions are, thus, executed whenever the media is accessed, be it from a server or from a cache. U.S. Pat. No. 6,108,637 is hereby incorporated by reference in its entirety.

The beacon instructions cause monitoring data reflecting information about the access to the media to be sent from the client that downloaded the media to a monitoring entity. Typically, the monitoring entity is an audience measurement entity that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the audience measurement company irrespective of whether the client is a panelist of the audience measurement company.

It is important, however, to link demographics to the monitoring information. To address this issue, the audience measurement company establishes a panel of users who have agreed to provide their demographic information and to have their Internet browsing activities monitored. When an individual joins the panel, they provide detailed information concerning their identity and demographics (e.g., gender, race, income, home location, occupation, etc.) to the audience measurement company. The audience measurement entity sets a cookie on the panelist computer that enables the audience measurement entity to identify the panelist whenever the panelist accesses tagged media and, thus, sends monitoring information to the audience measurement entity.

Since most of the clients providing monitoring information from the tagged pages are not panelists and, thus, are unknown to the audience measurement entity, it is necessary to use statistical methods to impute demographic information based on the data collected for panelists to the larger population of users providing data for the tagged media. However, panel sizes of audience measurement entities remain small compared to the general population of users. Thus, a problem is presented as to how to increase panel size while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the computers of their subscribers to enable the database proprietor to recognize the user when they visit their website.

The protocols of the Internet make cookies inaccessible outside of the domain (e.g., Internet domain, domain name, etc.) on which they were set. Thus, a cookie set in the amazon.com domain is accessible to servers in the amazon.com domain, but not to servers outside that domain. Therefore, although an audience measurement entity might find it advantageous to access the cookies set by the database proprietors, they are unable to do so.

In view of the foregoing, an audience measurement company would like to leverage the existing databases of database proprietors to collect more extensive Internet usage and demographic data. However, the audience measurement entity is faced with several problems in accomplishing this end. For example, a problem is presented as to how to access the data of the database proprietors without compromising the privacy of the subscribers, the panelists, or the proprietors of the tracked media. Another problem is how to access this data given the technical restrictions imposed by the Internet protocols that prevent the audience measurement entity from accessing cookies set by the database proprietor. In examples disclosed herein, the beaconing process is extended to encompass partnered database proprietors and to use such partners as interim data collectors. For example, the audience measurement entity and/or beacon instructions (e.g., Java, javascript, or any other computer language or script) may re-direct cause a client browser to request logging of an impression by a partner database proprietor. In this manner, if the partner database proprietor knows the audience member corresponding to the client browser, the partner database proprietor can provide demographic information corresponding to the audience member. In such examples, the number of re-direct messages to the partner database proprietor(s) may be numerous as the re-direct messaging occurs each time a client browser renders media having embedded beacon instructions. Example techniques for re-directing to one or more partner database proprietors to leverage distributed demographics in impression collection processes are disclosed in International PCT Application No. PCT/US2011/052623, filed on Sep. 21, 2011, and entitled "Methods and Apparatus to Determine Impressions Using Distributed Demographic Information," which is hereby incorporated by reference herein in its entirety. In addition, example techniques for collecting impressions and leveraging distributed demographics stored at one or more partner database proprietors are disclosed in International PCT Application No. PCT/US2011/065881, filed on Dec. 19, 2011, and entitled "Methods and Apparatus to Determine Media Impressions Using Distributed Demographic Information," which is hereby incorporated by reference herein in its entirety.

Example methods, apparatus and/or articles of manufacture disclosed herein collect audience exposure data using cookie mapping techniques in which an audience measurement entity (AME) cookie for a particular audience member is mapped to a partnered database proprietor cookie (a partner cookie) once during the life of the cookies (e.g., while the cookies are valid and/or not deleted or replaced in client machines). In this manner, the AME need only re-direct a client browser once (during the lifetime of the cookie) to a particular database proprietor to determine the partner cookie to be mapped to the AME cookie in the client browser. Once the cookie mapping is complete, the AME can monitor media exposures to one or more panelist and/or non-panelist audience member(s) using the client browser based on the AME cookie, and receive demographic information for the audience member(s) from the partner based on the AME-to-partner cookie mapping. This reduces the number of re-directs to the database proprietor needed to, for example, only one during the life or validity of the AME and partner cookies. By reducing the number of re-directs, there are fewer interruptions, less interference, and/or less background processing to negatively affect performance of client browsers, thus, improving an overall user experience for audience members. Network traffic is also reduced, thereby improving the overall efficiency of the networking environment by reducing network congestion and delay. Moreover, the amount of processing required by the database proprietor is reduced. Further, the amount of data (e.g., the number of impressions) shared with the database proprietor is reduced.

Using the AME-to-partner cookie mappings, the audience measurement entity can request demographic information from the partnered database proprietors for partner cookies that are mapped to their AME cookies in the AME-to-partner cookie mappings. In response, the partnered database proprietors provide their logs and demographic information to the audience measurement entity which then compiles the collected data into statistical reports accurately identifying the demographics of persons accessing the tagged media. Because the identification of clients is done with reference to enormous databases of users far beyond the quantity of persons present in a conventional audience measurement panel, the data developed from this process is extremely accurate, reliable and detailed. In some examples, by agreeing to participate in concerted audience measurement efforts, the partnered database proprietors are provided with audience demographic and exposure information collected by other partnered database proprietors. In this manner, partnered database proprietors can supplement their own audience exposure metrics with information provided by other partnered database proprietors.

Example methods, apparatus, and articles of manufacture disclosed herein can be used to determine media impressions (e.g., content impressions and/or advertisement impressions), media exposure (e.g., content exposure and/or advertisement exposure) using demographic information, which is distributed across different databases (e.g., different website owners, service providers, streaming media provider, etc.) on the Internet. Not only do example methods, apparatus, and articles of manufacture disclosed herein enable more accurate correlation of Internet media exposure to demographics, but they also effectively extend panel sizes and compositions beyond persons participating in the panel of an audience measurement entity and/or a ratings entity to persons registered in other Internet databases such as the databases of social media sites such as Facebook, Twitter, Google, etc. and/or any other Internet sites such as Yahoo!, Amazon.com, etc. This extension effectively leverages the media tagging capabilities of the ratings entity and the use of databases of non-ratings entities such as social media and/or other websites to create an enormous, demographically accurate panel that results in accurate, reliable measurements of exposures to Internet media such as content, advertising and/or programming.

Traditionally, audience measurement entities (also referred to herein as "ratings entities") determine demographic reach for media (e.g., advertising and content programming) based on registered panel members. That is, an audience measurement entity enrolls people that consent to being monitored into a panel. During enrollment, the audience measurement entity receives demographic information from the enrolling people so that subsequent correlations may be made between media exposure (e.g., advertisement/content exposure) to those panelists and different demographic markets. Unlike traditional techniques in which audience measurement entities rely solely on their own panel member data to collect demographics-based audience measurement data, example methods, apparatus, and/or articles of manufacture disclosed herein enable an audience measurement entity to utilize demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel but who has shared their demographics with a database proprietor. Any entity having a database identifying demographics of a set of individuals may cooperate with the audience measurement entity. Such entities may be referred to as "database proprietors" and include entities such as Facebook, Google, Yahoo!, MSN, Twitter, Apple iTunes, Experian, etc.

Example methods, apparatus, and/or articles of manufacture disclosed herein may be implemented by an audience measurement entity (e.g., any entity interested in measuring or tracking audience exposures to advertisements, content, and/or any other media) in cooperation with any number of database proprietors such as online web services providers to develop online media exposure metrics. Such database proprietors/online web services providers may be social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web site(s) that maintain user registration records.

To increase the likelihood that measured media exposure is accurately attributed to the correct demographics, example methods, apparatus, and/or articles of manufacture disclosed herein use demographic information located in the audience measurement entity's records and demographic information located at one or more database proprietors (e.g., web service providers) that maintain records or profiles of users having accounts therewith. In this manner, example methods, apparatus, and/or articles of manufacture disclosed herein may be used to supplement demographic information maintained by a ratings entity (e.g., an audience measurement company such as The Nielsen Company of Schaumburg, Ill., United States of America) that collects media exposure measurements and/or demographics) with demographic information from one or more different database proprietors (e.g., web service providers).

The use of demographic information from disparate data sources (e.g., high-quality demographic information from the panel(s) of an audience measurement entity and/or registered user data of web service providers) results in improved reporting effectiveness of metrics for both online and offline advertising campaigns. Example techniques disclosed herein use online registration data to identify demographics of users and use server impression counts, tagging (also referred to as beaconing), and/or other techniques to track quantities of impressions attributable to those users. Online web service providers such as social networking sites (e.g., Facebook) and multi-service providers (e.g., Yahoo!, Google, Experian, etc.) (collectively and individually referred to herein as database proprietors) maintain detailed demographic information (e.g., age, gender, geographic location, race, income level, education level, religion, etc.) collected via user registration processes. An impression corresponds to a home or individual having been exposed to the corresponding media (e.g., content and/or advertisement). Thus, an impression represents a home or an individual having been exposed to an advertisement or content or group of advertisements or content. In Internet advertising, a quantity of impressions or impression count is the total number of times an advertisement or advertisement campaign has been accessed by a web population (e.g., number of times access may be decreased by, for example, pop-up blockers and/or increased by, for example, retrieval from local cache memory).

Example methods, apparatus, and/or articles of manufacture disclosed herein also enable reporting TV and online ratings (e.g., using gross rating points (GRPs)) in a side-by-side manner. For instance, techniques disclosed herein enable advertisers to report quantities of unique people or users that are reached individually and/or collectively by TV and/or online advertisements.

Example methods, apparatus, and/or articles of manufacture disclosed herein also collect impressions mapped to demographics data at various locations on the Internet. For example, an audience measurement entity collects such impression data for its panel and enlists one or more online demographics proprietors to collect impression data for their subscribers. By combining this collected impression data, the audience measurement entity can then generate GRP metrics for different advertisement campaigns. These GRP metrics can be correlated or otherwise associated with particular demographic segments and/or markets that were reached.

Example methods disclosed herein include sending a first request to an audience measurement entity, and sending a second request to cause a database proprietor to send to the audience measurement entity a cookie mapping of an audience measurement entity cookie to a database proprietor cookie corresponding to a client. Some example methods further include storing the database proprietor cookie. In some examples, sending the first request to the audience measurement entity is in response to executing beacon instructions in a web page. In some examples, the second request is further to cause the database proprietor to send to the audience measurement entity a demographic characteristic associated with the client.

Some example methods further include sending a third request to the audience measurement entity, and sending a fourth request to cause a second database proprietor to send to the audience measurement entity a second cookie mapping of the audience measurement entity cookie to a second database proprietor cookie. In some such examples, the second request is to cause the database proprietor to send the cookie mapping to the audience measurement entity asynchronously. Some example methods further include sending a third request to the audience measurement entity, the third request including the cookie mapping.

Example apparatus disclosed herein include a communications interface and a web browser. The web browser is to send a first request to an audience measurement entity via the communications interface, and send a second request via the communications interface to cause a database proprietor to send to the audience measurement entity a cookie mapping of an audience measurement entity cookie to a database proprietor cookie corresponding to a client. In some examples, the web browser is to send the audience measurement entity cookie in the first request. In some example apparatus, the web browser is to send the first request to the audience measurement entity in response to executing beacon instructions in a web page.

In some example apparatus, the second request is further to cause the database proprietor to send to the audience measurement entity a demographic characteristic associated with the client. In some examples, the web browser is to send a third request to the audience measurement entity, and send a fourth request to a second database proprietor to cause the second database proprietor to send to the audience measurement entity a second cookie mapping of the audience measurement entity cookie to a second database proprietor cookie. In some examples, the second request is to cause the database proprietor to send the cookie mapping to the audience measurement entity asynchronously. In some examples, the web browser is to send a third request to the audience measurement entity, the third request including the cookie mapping.

Example methods disclosed herein include sending a response to a request, the response including an identification of a first cookie used by an audience measurement entity and an indication of a partner database proprietor, and receiving a mapping of the first cookie to a second cookie used by the partner database proprietor and demographic information associated with the second cookie by the partner database proprietor. In some example methods, the mapping and the demographic information are received in an asynchronous communication from the partner database proprietor. In some examples, the response comprises a re-direct message, the re-direct message to cause a client device to send a request to the partner database proprietor.

In some example methods, the mapping is received at a first time and the demographic information is received at a second time after the first time. Some example methods further include selecting the database proprietor from a list of database proprietors based on a web site from which the beacon request originated. In some examples, selecting the database proprietor includes determining a quality of demographic information provided by the database proprietor for an expected demographic group associated with the web site. Some example methods further include determining whether the beacon request includes the first cookie and, when the beacon request does not include the first cookie, generating the first cookie.

Example apparatus disclosed herein include a re-director to send a response to a request, the response including an identification of a first cookie used by an audience measurement entity and an indication of a partner database proprietor; and a communication interface to receive a mapping of the first cookie to a second cookie used by the partner database proprietor and demographic information associated with the second cookie by the partner database proprietor. In some example apparatus, the communication interface is to receive the mapping and the demographic information in an asynchronous communication from the partner database proprietor.

In some examples, the response includes a re-direct message, the re-direct message to cause a client device to send a request to the partner database proprietor. In some examples, the communication interface is to receive the mapping at a first time and receive the demographic information at a second time after the first time. Some example apparatus further include a partner selector to select the database proprietor from a list of database proprietors based on a web site from which the request originated. In some examples, the partner selector is to select the database proprietor comprises determining a quality of demographic information provided by the database proprietor for an expected demographic group associated with the web site. Some example apparatus further include a cookie generator, the re-director to determine whether the request includes the first cookie and, when the request does not include the first cookie, the cookie generator is to generate the first cookie.

Example methods disclosed herein include receiving a first request from a client device, the first request comprising an audience measurement entity cookie identifier, and determining a cookie mapping of the audience measurement entity cookie to a database proprietor cookie associated with the client. Some example methods further include sending a re-direct message to cause the client to send the cookie mapping to the audience measurement entity. In some such examples, the re-direct message includes a database proprietor cookie identifier, the audience measurement entity cookie identifier, and an indication of association between the database proprietor cookie identifier and the audience measurement entity cookie identifier.

Some example methods further include sending a message to the audience measurement entity, the message comprising the cookie mapping. In some such examples, the message further includes a second cookie mapping between a second audience measurement entity cookie identifier for a second client device and a second database proprietor cookie associated with the second client device.

Example methods disclosed herein include receiving a first request from a client device, the first request comprising an audience measurement entity cookie identifier, and providing a cookie mapping to an audience measurement entity associated with the cookie, the cookie mapping comprising an association between a database proprietor cookie and the audience measurement cookie associated with the client. In some examples, providing the cookie mapping includes sending a re-direct message to cause the client to send the cookie mapping to the audience measurement entity. In some such examples, the re-direct message includes a database proprietor cookie identifier, the audience measurement entity cookie identifier, and an indication of association between the database proprietor cookie identifier and the audience measurement entity cookie identifier.

In some example methods, providing the cookie mapping includes sending a message to the audience measurement entity, the message comprising the cookie mapping. In some such examples, the message further includes a second cookie mapping between a second audience measurement entity cookie identifier for a second client device and a second database proprietor cookie associated with the second client device.

Example apparatus disclosed herein include a communications interface to receive a first request from a client device, the first request comprising an audience measurement entity cookie identifier; and a cookie mapper to determine a cookie mapping of the audience measurement entity cookie to a database proprietor cookie associated with the client. In some example apparatus, the communications interface is to provide the cookie mapping to an audience measurement entity associated with the cookie, the cookie mapping comprising an association between a database proprietor cookie and the audience measurement cookie associated with the client.

In some examples, the communications interface is to provide the cookie mapping by sending a re-direct message to cause the client to send the cookie mapping to the audience measurement entity. In some such examples, the re-direct message includes a database proprietor cookie identifier, the audience measurement entity cookie identifier, and an indication of association between the database proprietor cookie identifier and the audience measurement entity cookie identifier. In some example apparatus, the communications interface is to provide the cookie mapping by sending a message to the audience measurement entity, the message comprising the cookie mapping. In some such examples, the message further comprises a second cookie mapping between a second audience measurement entity cookie identifier for a second client device and a second database proprietor cookie associated with the second client device.

Example apparatus disclosed herein include a communications interface to receive a first request from a client device, the first request comprising an audience measurement entity cookie identifier, and to provide a message to an audience measurement entity associated with the cookie, the message including a cookie mapping the cookie mapping comprising an association between a database proprietor cookie and the audience measurement cookie associated with the client; and a processor to execute instructions, the instructions to cause the processor to generate the message.

Example methods disclosed herein include providing instructions to be included in a web site, the instructions to cause a client, upon execution of the instructions, to initiate a process including: sending a first request to an audience measurement entity; and sending a second request to cause a database proprietor to send to the audience measurement entity a cookie mapping of an audience measurement entity cookie to a database proprietor cookie corresponding to the client. Some example methods further include receiving information associated with the web site and generating the instructions based on the information. In some examples, the process further includes receiving a re-direct message from the audience measurement entity, the re-direct message comprising an identifier of the audience measurement cookie.

Example apparatus disclosed herein include a communications interface and a processor to generate instructions to be included in a web site and to cause the communications interface to provide the instructions to a web server associated with the web site, the instructions to cause a client, upon execution of the instructions, to initiate a process comprising: sending a first request to an audience measurement entity; and sending a second request to cause a database proprietor to send to the audience measurement entity a cookie mapping of an audience measurement entity cookie to a database proprietor cookie corresponding to the client. In some examples, the communications interface is to receive information associated with the web site, the processor to generate the instructions based on the information. In some example apparatus, the process further comprises receiving a re-direct message from the audience measurement entity, the re-direct message comprising an identifier of the audience measurement cookie.

Figure 2:
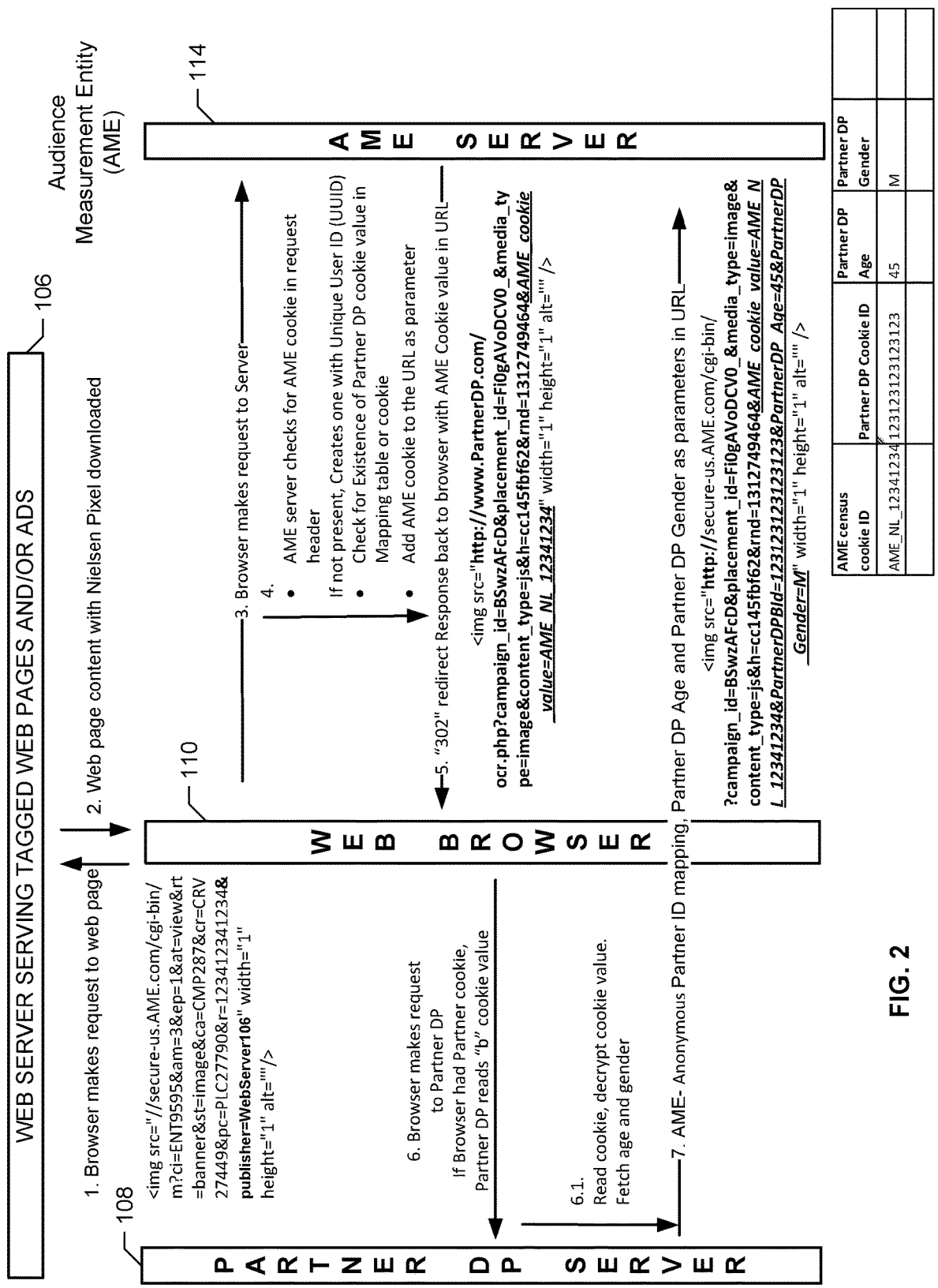
FIG. 2 depicts an example messaging flow diagram corresponding to the example system of FIG. 1 to generate an AME-to-partner cookie mapping based on a re-direct from the AME to a partner DP.

FIG. 1 depicts an example system 100 to generate an audience measurement entity (AME)-to-partner cookie mapping based on a re-direct from the AME 102 to a partner database proprietor (DP) 104. FIG. 2 depicts an example messaging flow diagram 200 corresponding to the example system 100 of FIG. 1 to generate an AME-to-partner cookie mapping based on a re-direct from the AME 102 to a partner DP 104.

In the example of FIG. 1, a web server 106 provides access to one or more web sites. The example system 100 determines an AME-to-partner cookie mapping for web browsers that request access to the web sites served by the web server 106 (e.g., an example web browser 110). While an example web browser 110 is shown for illustration, the example system 100 of FIG. 1 may duplicate and/or repeat the illustrated process of FIG. 1 for the web browser 110 and/or other web browsers. The example web browser 110 of FIG. 1 is a particular instance of a web browser computer application executing on a particular computing device (e.g., a personal computer, a mobile device, such as the processing platform 1400 of FIG. 14). However, an example implementation of the example system 100 of FIG. 1 will typically involve many such browsers.

An example web page available from the example web server 106 of FIG. 1 is tagged with beacon instructions. In some examples, the AME 102 provides the tag or beacon instructions to the web server 106 to be included in web sites or elements or web sites (e.g., media, advertisements, and/or other elements of web sites) served by the web server 106. The provided beacon instructions may allow for and/or require modification by the web server based on the specific page that is tagged and/or based on any arguments and/or other variables present on the web page.

When the example browser 110 requests the web page from the web server 106 (e.g., arrow (1) of FIG. 1), the example web server 106 returns the page content with beacon instructions (e.g., arrow (2) of FIG. 1). The example beacon instruction of FIG. 1 is provided by the AME 102 and/or modified from an instruction provided by the AME 102 to the web server 106, and includes a URL 112 that points to an AME server 114 and specifies, among other things, a media presentation and/or exposure resulting from providing the requested page from the web server 106, and an indication (e.g., the bolded text in the URL 112) of a web server or publisher (e.g., the web server 106) that provided the beacon instruction (e.g., arrow (3) of FIG. 1). In some examples, the web server 106 is controlled by the partner DP 104 or another database proprietor. In some such examples, the web server 106 includes an identifier or other indication of the partner DP 104 in the URL 112. If the browser 110 has previously stored a cookie corresponding to the AME 102 (e.g., an AME cookie) (and the cookie has not expired), the example browser 110 provides the AME cookie with the beacon request).

The example AME server 114 includes a beacon request re-director 120, a cookie generator 122, a partner selector 124, a beacon instruction generator 126, and a communication interface 128. When the AME server 114 receives the beacon request from the browser 110, the example beacon request re-director 120 determines whether the beacon request includes an AME cookie. If the beacon request does not include an AME cookie, the example cookie generator 122 creates an AME cookie for the browser 110. If the beacon request includes an AME cookie, the example beacon request re-director 120 determines whether the AME cookie is associated with (e.g., mapped to) a DP cookie value for a DP (e.g., partner DP 104). If there is a DP cookie, the example AME server 114 stores the beacon in association with the browser 110. The AME server 114 may or may not respond to the beacon request. In the illustrated example, the AME server 114 responds to the beacon request with something not intended to affect display of the tagged web page or advertisement (e.g., with a transparent 1×1 pixel image or other requested media such as a placeholder). In some examples, the beacon request does not elicit a response.

If the AME server 114 of the illustrated example created an AME cookie for the browser 110, or if there is no DP cookie value for the browser 110 associated with (e.g., mapped to) an existing AME cookie (e.g., the tagged web page or tagged ad is not from a DP server), the example beacon request re-director 120 adds an AME cookie to a URL parameter 116 of a response to the beacon request. The example beacon request re-director 120 sends a re-direct response (e.g., an HTTP "302 Found" re-direct message) to the browser 110 in response to the beacon request (e.g., arrow (4) of FIG. 1). The example URL parameter 116 of FIG. 1 includes an address of a partner DP server 108 (e.g., the bolded and underlined text in URL 116 of FIG. 1) and an identifier or value of the AME cookie to be mapped to a cookie of the partner DP 104 (e.g., the bolded and not underlined text). The example URL parameter 116 further includes an address of the partner DP server 108. The example partner selector 124 selects the partner DP server to which the re-direct message is to be directed. For example, the partner selector 124 may select one or more of multiple partner DPs (e.g., from a list of cooperating partner DPs) based on, for example, the expected demographics of the media served by the web server 106 (e.g., the tagged media). In some other examples, the partner selector 124 selects a default partner DP and one or more backup partner DPs.

The example beacon instruction generator 126 of FIG. 1 receives information associated with the example web server 106 and/or web sites to be served by the web server 106. The information may include an address and/or URL range of the web server 106 and/or media. Based on the information, the example beacon instruction generator 126 generates beacon instructions to be used by the example web server 106 to tag media served by the web server 106. In some other examples, the beacon instruction generator 126 provides generic instructions to the web server 106 that may be modified by the web server 106 based on the media being served.

The example communication interface 128 communicatively couples the example AME server 114 to the example browser 110 (e.g., via a network such as the Internet). The example communication interface 128 includes a combination of hardware and software and/or firmware to transmit and receive communications, such as the beacon requests and re-direct responses. In some examples, the communication interface 128 includes load balancing features for dividing large numbers of communications between multiple AME servers 114.

The example browser 110 receives the re-direct response to the beacon request and makes a request to the partner DP server 108 based on (e.g., using) the URL 116 (e.g., arrow (5) of FIG. 1). If the browser 110 has a cookie for the domain of the partner DP 104, the example browser 110 provides the cookie with the request. The example partner DP server 108 of FIG. 1 includes a cookie mapper 130 and a communications interface 132. The partner DP server 108 determines whether a cookie is provided by the browser 110. If the browser 110 provides a cookie with the request, the example partner DP server 108 (e.g., via the cookie mapper 130) recognizes the cookie and maps the partner DP cookie to the AME cookie identified in the URL 116 (e.g., stores an association between the partner DP cookie and the AME cookie). The example partner DP server 108 sends a message to the example AME server 114 that indicates a mapping between the AME cookie and the partner DP cookie for the browser 110 (e.g., arrow (6) of FIG. 1). The example message includes a URL 118 that provides the mapping (e.g., the bolded text).

The example cookie mapper 130 may additionally or alternatively be implemented in the AME servers 114. As described below, in some examples, the AME server performs mapping between AME cookies and partner DP cookies based on AME cookies, partner DP user identifiers and/or partner DP cookies associated with the browser 110.

The example communication interface 312 communicatively couples the example partner DP server 108 to the example browser 110 (e.g., via a network such as the Internet). The example communication interface 132 includes a combination of hardware and software and/or firmware to transmit and receive communications, such as the beacon re-directs, cookie mappings, and demographic information. In some examples, the communication interface 132 includes load balancing features for dividing large numbers of communications between multiple partner DP servers 108.

In the example of FIG. 1, the mapping URL 118 further includes demographic information associated with the browser (e.g., demographic information for a user of the browser) that is known to the partner DP 104. For example, a user of the browser 110 may have provided the demographic information to the partner DP 104 in exchange for the use of a service provided by the partner DP 104. In some examples, the mapping URL 118 further includes a timestamp of the mapping and/or a timestamp of another event leading to the mapping to facilitate mapping of the AME cookie and/or the partner DP cookie to the impression data. In some other examples, the AME server 114 stores the timestamps derived from HTTP messages transmitted and received during the mapping process. In some examples, the AME cookie is unique such that the timestamps are not necessary for matching the AME cookie and/or the partner DP cookie to impressions data.

The example AME server 114 of FIG. 1 stores the mapping between the AME cookie and the partner DP cookie. The example AME server 114 of FIG. 1 further stores demographic information for the browser 110 received from the partner DP (if any). For subsequent beacon requests received from the browser 110 for the same AME cookie, the example AME server 114 stores the beacon request (and associated page view and/or exposure information) and does not re-direct the browser 110 thereby reducing traffic to the DP and also reducing data (e.g., impression counts) provided to the DP).

Figure 3:
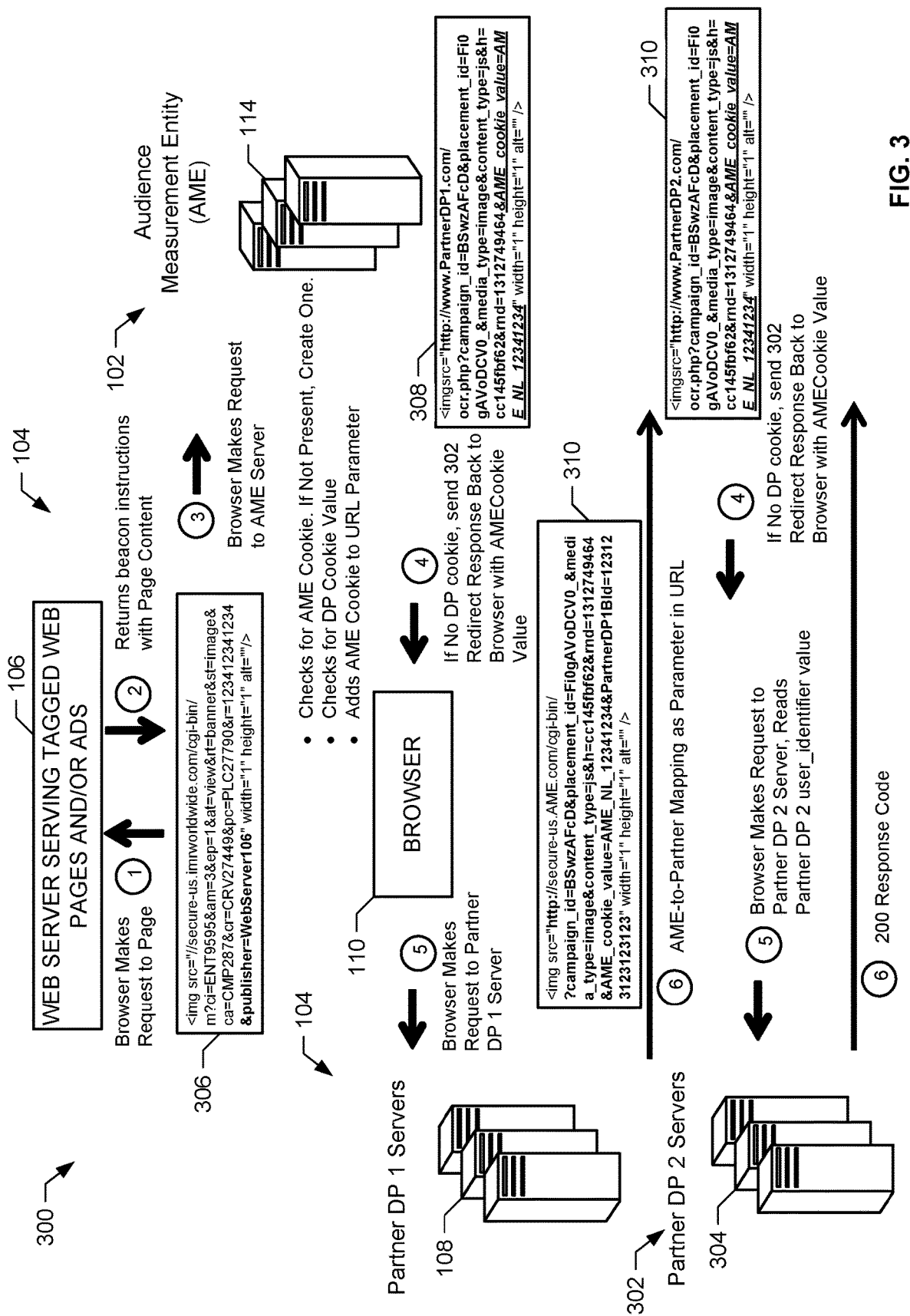
FIG. 3 depicts another example system to generate an AME-to-partner DP1 cookie mapping based on a re-direct from the AME to a partner DP1, and to further send a request to a second partner DP (partner DP2) to identify a registered user of the partner DP2.
Figure 4:
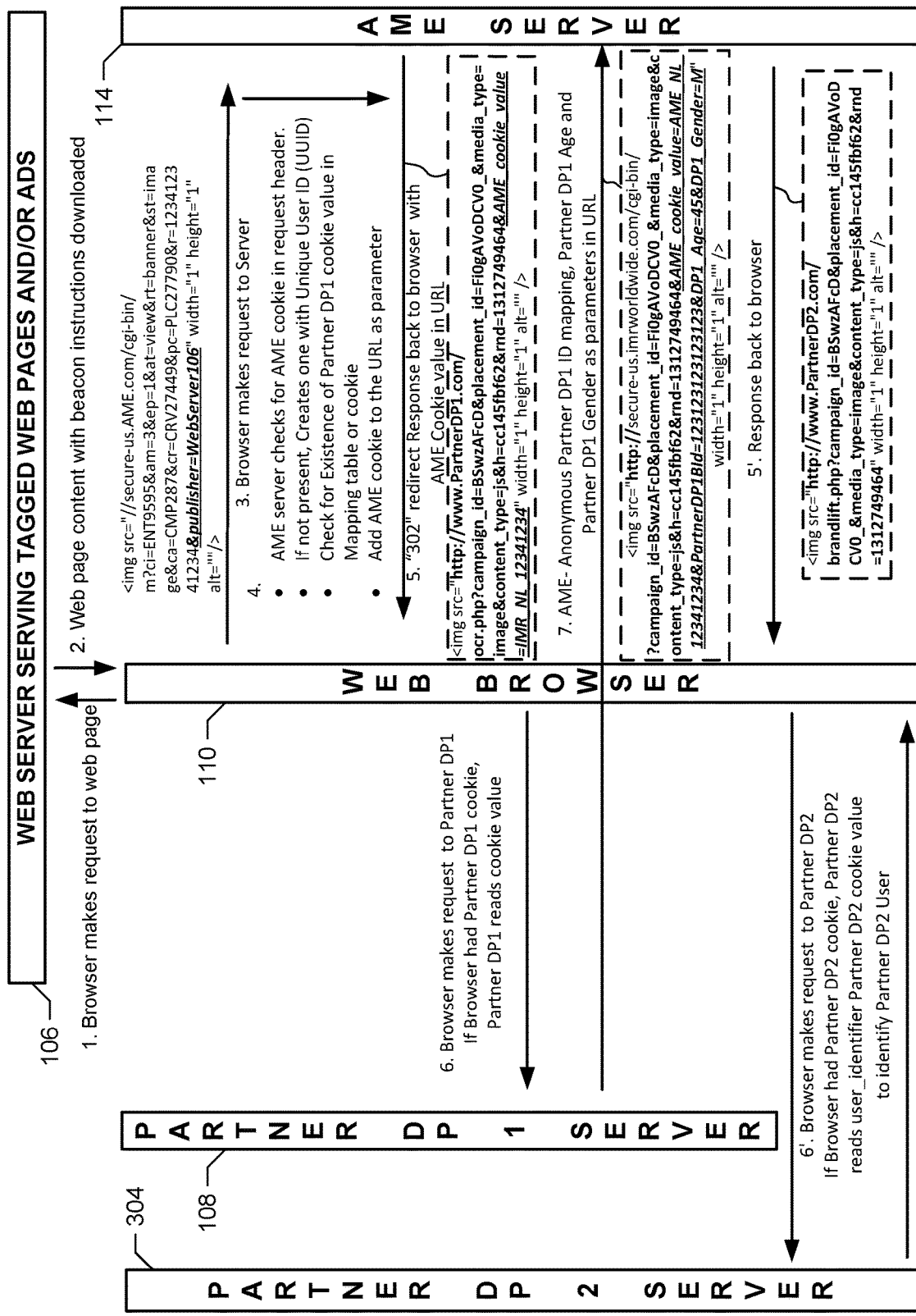
FIG. 4 depicts an example messaging flow diagram corresponding to the example system of FIG. 3 to generate an AME-to-partner DP1 cookie mapping based on a re-direct from the AME to a partner DP1, and to further send a request to a second partner DP (partner DP2) to identify a registered user of the partner DP2.

FIG. 3 depicts another example system 300 to generate an AME-to-first partner DP cookie mapping based on a re-direct from the AME to a partner DP1, and to further send a request to a second partner DP (partner DP2) to identify a registered user of the partner DP2. FIG. 4 depicts an example messaging flow diagram corresponding to the example system of FIG. 3 to generate an AME-to-partner DP1 cookie mapping based on a re-direct from the AME to a partner DP1, and to further send a request to a second partner DP (partner DP2) to identify a registered user of the partner DP2. The example system 300 of FIG. 3 includes the AME 102, the first partner DP 104, the web server 106, the first partner DP server(s) 108, the example browser 110, and the AME server(s) 114 of FIG. 1. The example system 300 of FIG. 3 further includes a second partner DP 302 that includes one or more second partner DP server(s) 304.

In a manner similar to arrows (1) and (2) of FIG. 1, the example browser 110 requests a web page from the first web server 106 and receives the media (e.g., a web page, an advertisement) with beacon instructions. The request to the web server 106 can be for any media (e.g., a web page, a part of a web page such as an advertisement) that is tagged. The web page itself can be tagged and/or an advertisement or other portion within the page can be tagged. The example beacon instruction includes a URL 306 specifying the web server, publisher, and/or website proprietor from which the beacon instruction originated (e.g., the bold font). In a manner similar to arrow (3) of FIG. 1, the example browser 110, upon receiving the beacon instruction, makes a beacon request to the example AME server 114. If the browser 110 has previously stored a cookie corresponding to the AME 102 (and the cookie has not expired), the example browser 110 provides the AME cookie with the beacon request). In the examples of FIGS. 1 and 3, the AME server 114 need not determine whether the AME cookie is expired because the browser 110 does not send (e.g., deletes) an expired AME cookie (or any expired cookies).

When the AME server 114 receives the beacon request from the browser 110, the example AME server 114 determines whether the beacon request includes an AME cookie. If the beacon request does not include an AME cookie, the example AME server 114 creates an AME cookie for the browser 110. The AME cookie expires after a time period, which may be set in the AME cookie, may be set by the browser 110, and/or may be a universal upper limit on the lifetimes of cookies. When the AME cookie expires, the example browser 110 discards the AME cookie (e.g., deletes from storage). The next beacon request from the browser 110 does not include an AME cookie, so the AME server 114 treats the browser 110 as unknown and supplies a new AME cookie. If the beacon request includes an AME cookie, the example AME server 114 determines whether the AME cookie is associated with (e.g., mapped to) a DP cookie value for the specified DP in the URL 112 (e.g., partner DP 104). If there is a DP cookie, the example AME server 114 stores the beacon in association with the browser 110.

If the AME server 114 created an AME cookie for the browser 110, or if there is no DP cookie value for the browser 110 associated with (e.g., mapped to) an existing AME cookie, the example AME server 114 adds an AME cookie to a URL parameter 308 of a re-direct response to the beacon request. The example AME server 114 then sends a re-direct response (e.g., an HTTP "302 Found" re-direct message) to the browser 110 in response to the beacon request (e.g., in a manner similar to arrow (4) of FIG. 1). The example URL parameter 308 of FIG. 3 includes an address of the first partner DP server 108 (e.g., the bolded and not underlined text) and an identifier or value of the AME cookie to be mapped to a cookie of the first partner DP 104 (e.g., the bolded and underlined text). If the browser 110 has previously stored a cookie corresponding to the domain of the first partner DP 104, the example browser 110 includes the first partner DP cookie with the request to the first partner DP server 108.

The example first partner DP server 108 determines whether the request includes a first DP cookie. If the request includes a first partner DP cookie, the example first partner DP server 108 sends a message to the AME server 114 including a URL 310. The URL 310 includes a mapping of the first partner DP cookie to the AME cookie (e.g., the bolded text). In some examples, the first partner DP server 108 stores the first partner DP cookie for later mapping and transmission to the AME server 114 (e.g., as a batch). At periodic or aperiodic intervals, the first partner DP server 108 sends multiple messages including the URLs (e.g., the URL 310) that indicate the respective mappings of first partner DP cookies to AME cookies.

In addition to or as an alternative to mapping the AME cookie to a partner DP cookie for the first partner DP 104 (e.g., a partner DP from which the browser requested the web page), the example system 300 maps the AME cookie for the browser 110 to a partner DP cookie for the second partner DP 302. The example second partner DP 302 may have additional or alternative information about the user of the browser 110 than the first partner DP 104. In some examples, the first partner DP 104 may have no information associated with the browser 110, while the second partner DP 302 has useful demographic or other information for the AME 102.

In some examples, the system 300 maps the AME cookie to the second partner DP cookie to enable the second partner DP 302 to log impressions for a media (e.g., advertisement) campaign. The example second partner DP 302 provides impression information that is tracked via the second partner DP cookie to the example AME 102, along with a mapping of the second partner DP cookie to the example AME cookie for the browser 110. In some examples, the second partner DP 302 further provides demographic information associated with the impressions.

To map the AME cookie for the browser 110 to the second partner DP cookie, the example AME server 114 sends a re-direct response to the beacon request that includes a URL 312 to the second partner DP 302 (e.g., to the second partner DP server 304). For example, the tagged media may include multiple beacons to enable the AME 102 to re-direct the browser 110 to multiple partner DPs. Additionally or alternatively, the tagged media only issues one beacon request and the AME server 114 may respond with multiple re-direct messages. Additionally or alternatively, each DP (e.g., the first partner DP 104, the second partner DP 304, etc.) may respond to a request caused by a re-direction by returning a re-direction to another DP. In examples where the AME server 114 sends multiple re-directs, the example URL 312 of FIG. 3 is similar to the URL 308, except that the URL 310 specifies the address of the second partner DP server(s) 304 instead of the address of the first partner DP server(s) 108.

The example URL 310 of the illustrated example includes the AME cookie value. The example browser 110 receives the re-direct response and sends a request to the example second partner DP server 304. If the browser 110 has a cookie for the second partner DP server 304, the browser 110 includes the cookie in the request. The example second partner DP server 304 determines whether the request from the browser 110 includes a cookie. If the request includes a cookie, the example second partner DP server 304 reads a value from the cookie that identifies the browser 110 or a user associated with the browser (e.g., uniquely identifies the user).

Unlike the example first partner DP 104, the example second partner DP 302 of the illustrated example of FIG. 3 provides the AME cookie to second partner DP cookie mapping at intervals instead of immediately upon generation of the mapping. For example, the second partner DP 302 stores the mapping between the second partner DP cookies and the mapped AME cookies for later transmission to the AME server 114 (e.g., as a batch). At periodic or aperiodic intervals, the second partner DP server 304 send one or more multiple messages including the respective mappings of second partner DP cookies to the AME cookies. The example second partner DP servers 304 may send a set of multiple mappings via one message in one or more data file (e.g., an array or other data structure). Additionally or alternatively, the second partner DP servers 304 may send multiple messages (e.g., dummy HTTP requests) in which each message includes a mapping (e.g., a URL containing the mapping information). If the example second partner DP server 304 recognizes the user (e.g., via the user identifier in the cookie), the example second partner DP server 304 sends a mapping message or other acknowledgement message to the example AME server 114 (e.g., a 200 OK HTTP response message).

The examples of FIG. 1-4, 5B, 6B, 7B, and/or 8B are shown in connection with operations that may be performed using machine readable instructions executed by one or more servers or computers in the example systems 100, 300 of FIGS. 1 and 3.

Figure 5A:
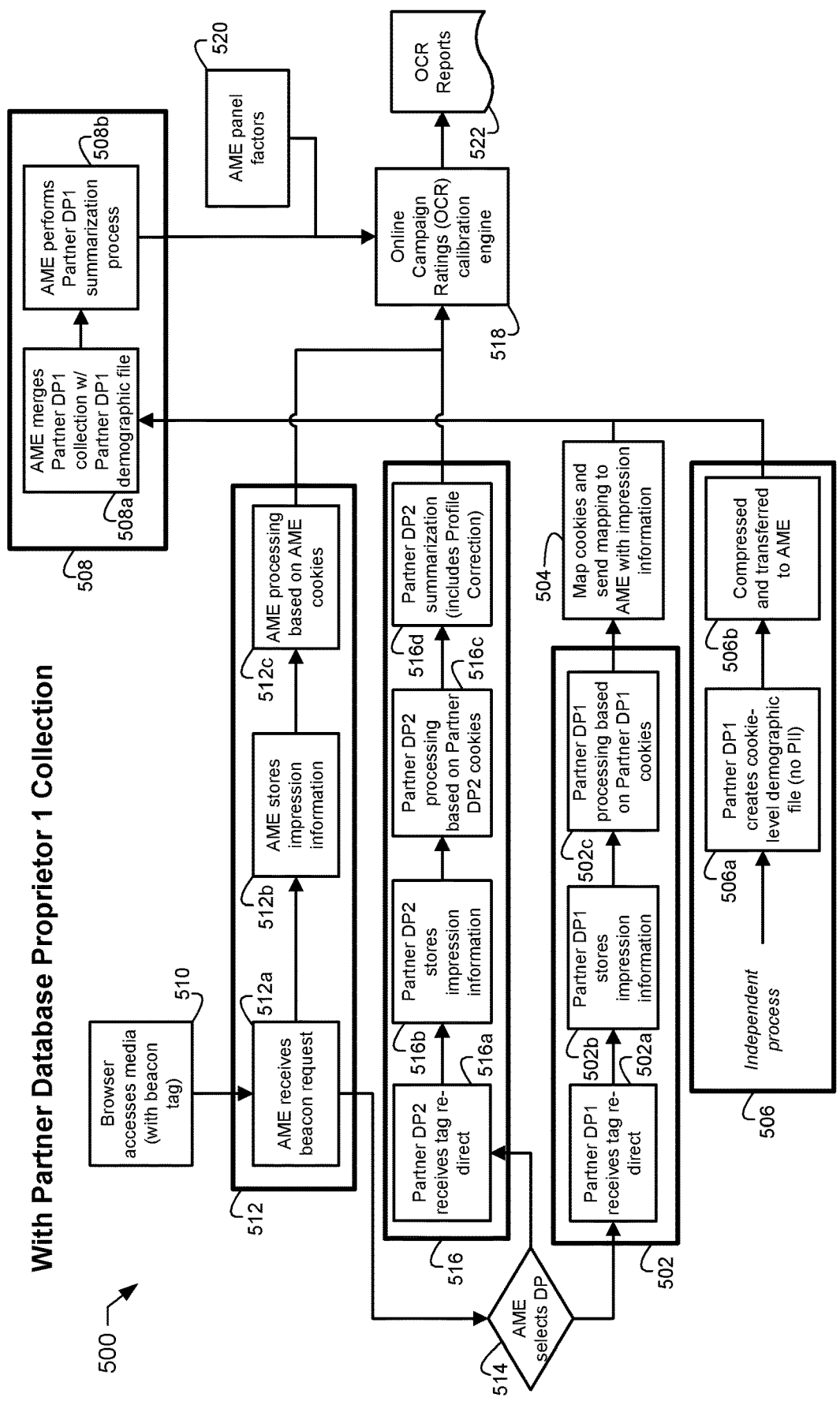
FIG. 5A is a flow diagram representative of example machine readable instructions that may be executed to collect distributed demographic information from first and second partner database proprietors in connection with collecting online campaign ratings (OCR) data from the first partner DP.

In the examples of FIGS. 5A, 6A, 7A, and 8A, the operations described as being performed by the AME may be implemented by, for example, the AME server(s) 114 of FIGS. 1-4, 5B, 6B, 7B, and/or 8B and the operations described as being performed by a partner DP may be performed by, for example, the partner DP servers 108, 304 of FIGS. 1-4, 5B, 6B, 7B, and/or 8B. In the example of FIG. 5A, a first database proprietor (DP1) has agreed to provide cookie-level data and a second database proprietor (DP2) has refused to provide cookie-level data but agreed to provide summarized data representing aggregations of its cookie-level data in buckets or categories (e.g., men, ages 30-40).

Figure 5B:
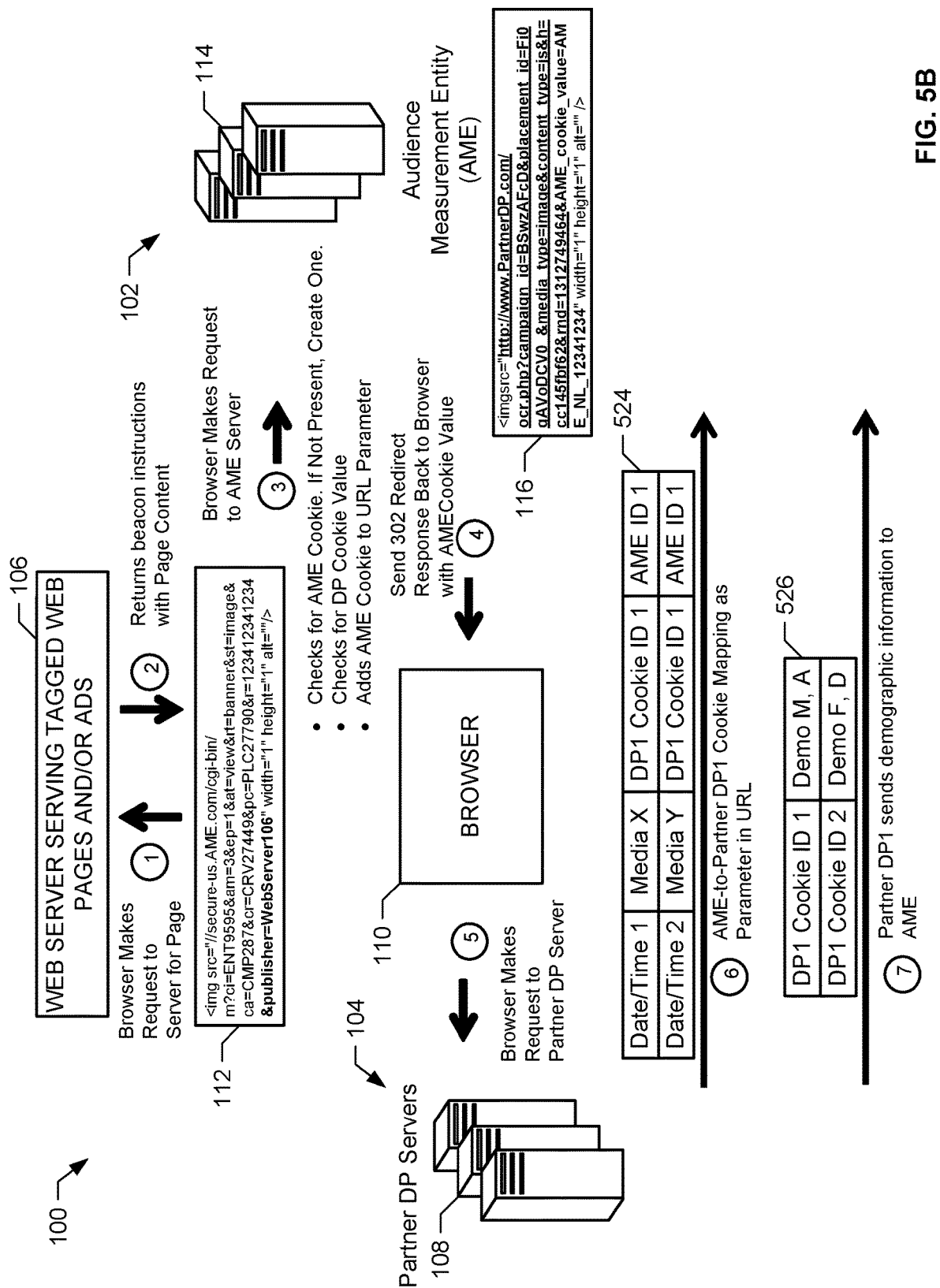
FIG. 5B illustrates an example process of the system of FIG. 1 implementing the instructions of FIG. 5A.

FIG. 5A is a flow diagram representative of example machine readable instructions 500 that may be executed to collect distributed demographic information from first and second partner database proprietors. FIG. 5B illustrates an example process of the system 100 of FIG. 1 implementing the instructions 500 of FIG. 5A.

At block 510, when a browser accesses media (e.g., arrow (1) of FIG. 5B), beacon instructions included in and/or associated with the media (e.g., arrow (2) of FIG. 5B) cause the browser to register an impression by sending a beacon request to the AME (e.g., arrow (3) of FIG. 5B). At operations in process block 512, the AME collects online activity data for the browser. For example, the AME receives a beacon request from a browser (block 512a), and collects and/or stores impression data contained in or otherwise associated with the beacon request (block 512b). The data associated with the beacon request may include an AME cookie associated with the browser and/or may identify media that triggered the beacon request. The AME processes the collected impression data based on the corresponding AME cookie received from the browser to, for example, correlate web page views and media exposures (block 512c).

At block 514, the AME determines which partner DP(s) the browser is to be re-directed. The example AME may select partner DP1, partner DP2, and/or one or more additional partner DPs. For example, the AME may select the partner DP1 based on an expected or estimated demographic composition of a tagged web site when a quality of demographic information for the expected or estimated demographic composition is higher for the partner DP1 than for other partner DPs. In some other examples, the AME may select multiple (e.g., all available) partner DPs (e.g., DP1 and DP2). Based on the result of block 514, the example AME sends a re-direct response to the client browser (e.g., arrow (4) of FIG. 5B) to cause the client browser to send a re-direct request to the partner DP1 (e.g., arrow (5) of FIG. 5B, initiating blocks 502a-502c) and/or to partner DP2 (e.g., initiating blocks 516a-516d).

In the illustrated example, operations in process block 502 are executed by the partner DP1, instead of the AME, to collect impression data based on beacon requests received from a web browser on a client computer. For example, after accessing tagged media, the client browser sends a beacon request to the AME and is re-directed by the AME to one or both of the partner DP1 and/or the partner DP2 (block 514). Assuming, for purposes of discussion, that the partner DP1 receives a message from a client browser based on the re-direction (e.g., block 502a), the partner DP1 accesses the tag information (e.g., media information, publisher information, a timestamp, etc.) from the message received from the client to thereby collect and/or store impression data from the browser (e.g., block 502b). The partner DPI processes the tag information to associate the tag information with partner DP1 cookie identifiers and/or AME cookie identifiers for the user exposed to the tagged media (block 502c). Thus, the example operations of block 502 enable the partner DP1 to collect impression information from panelist and/or non-panelist users that access tagged media. The collection of impression information by the partner DP1 may be done in addition to or as an alternative to collection of impression information by the AME.

At block 504, the partner DP1 compresses the raw impression data (e.g., media information, cookie identifiers, timestamp, etc.) collected by the partner DPI to send to the AME (e.g., arrow (6) of FIG. 5B). The impression data provided by the partner DP1 to the AME includes mappings between the AME cookie identifiers (e.g., identifiers received via the tag information) and the partner DPI cookie identifiers (e.g., identifiers of the users that are known to the partner DP1 and, for example, stored by the client device). FIG. 5B illustrates an example table 524 including a timestamp, impression information (e.g., a media identifier), and an association between a partner DP1 user identifier and an AME cookie identifier. The example partner DP1 sends the table 524 to the example AME server in a message corresponding to arrow (6) of FIG. 5B. The partner DPI cookie identifier may be anonymized in the impression data provided to the AME for privacy. The example mapping information enables the AME to correlate impression data among multiple partner DPs (e.g., DP1, DP2, etc.). Example blocks 502 and/or 504 of FIG. 5A iterate and/or continuously execute to repeatedly collect impression data and transfer the data to the AME.

At operations in process block 506, the partner DP1 generates user demographic files at the cookie level (block 506a). For example, the partner DP1 may generate a file including partner DP cookie identifiers to be mapped to AME cookies, and further including demographic information for the users respectively identified by the partner DP cookies. For example, the partner DP1 includes DP cookie identifiers of users, and the demographic information associated with the users, from whom DP cookies were received in association with a tag re-direct message (e.g., during the preceding reporting period). The cookie-level demographic files are compressed and transferred to the AME (e.g., periodically, aperiodically, in response to a request, at designated times, etc.) (e.g., block 506b, arrow (7) of FIG. 5B). An example table 526 is illustrated in FIG. 5B and includes demographic information associated with partner DP1 cookie identifiers. The demographic data may be limited to users for whom cookie mapping occurred or may cover a larger set of the database proprietor's cookies.

At operations referred to by reference numeral 508, the AME merges and/or aggregates the impression data and the demographic data from the partner DPI (block 508a). For example, the AME may associate the demographic information corresponding to the individual partner DP cookies with the impression data (e.g., impression data received in block 504 from the partner DP1, impression data received from other partner DPs, and/or other impression data collected by the AME) corresponding to the individual partner DP cookies. The example AME summarizes the findings of the partner DPI (e.g., by grouping the data into demographic groups and/or buckets) (block 508b). The partner DP demographic and impression information, and/or a summarization thereof may then be fed into a calibration engine for adjustment (e.g., calibration) based on known data (e.g., AME panelist data 520) and/or generation of media impression reports (e.g., online campaign ratings).

At operations in process block 516, upon receiving a request resulting from a re-direct response by the AME (block 516a), a second partner DP2 (e.g., server 304 of FIG. 3) collects and/or stores activity information corresponding to a cookie known to the second partner DP2 (e.g., second partner DP 302) for the browser (block 516b). The example partner DP2 collects tag information (e.g., impression data) in a manner similar to partner DP1 as described above with reference to the operations of block 502. The example partner DP2 processes the impression data based on the partner DP2 cookies (block 516c). The partner DP2 may perform processing in block 516c in a manner similar to the processing performed by the AME in block 512c). However, instead of compressing the data, the example second partner DP server 304 periodically summarizes the tag information and sends the tag information to the OCR calibration engine 518 (block 516d). For example, summarization of the data may include grouping impression information and/or demographic information into larger demographic groups rather than providing impression and/or demographic information for individual users and/or individual cookies. The example OCR calibration engine 518 further receives AME panel factors 520 (e.g., weights to be applied to the impression information based on characteristics of a representative AME panel). The example OCR calibration engine 518 generates OCR reports 522 based on the AME cookie to partner DP cookie mapping, partner DP demographics, partner DP activity measurements (e.g., impression data collection), and/or AME activity measurements (e.g., AME panelist and/or non-panelist impression collection). The example instructions 500 may include any number of partner DPs performing blocks 502 and/or 504 and/or may include any number of partner DPs performing block 516.

Figure 6A:
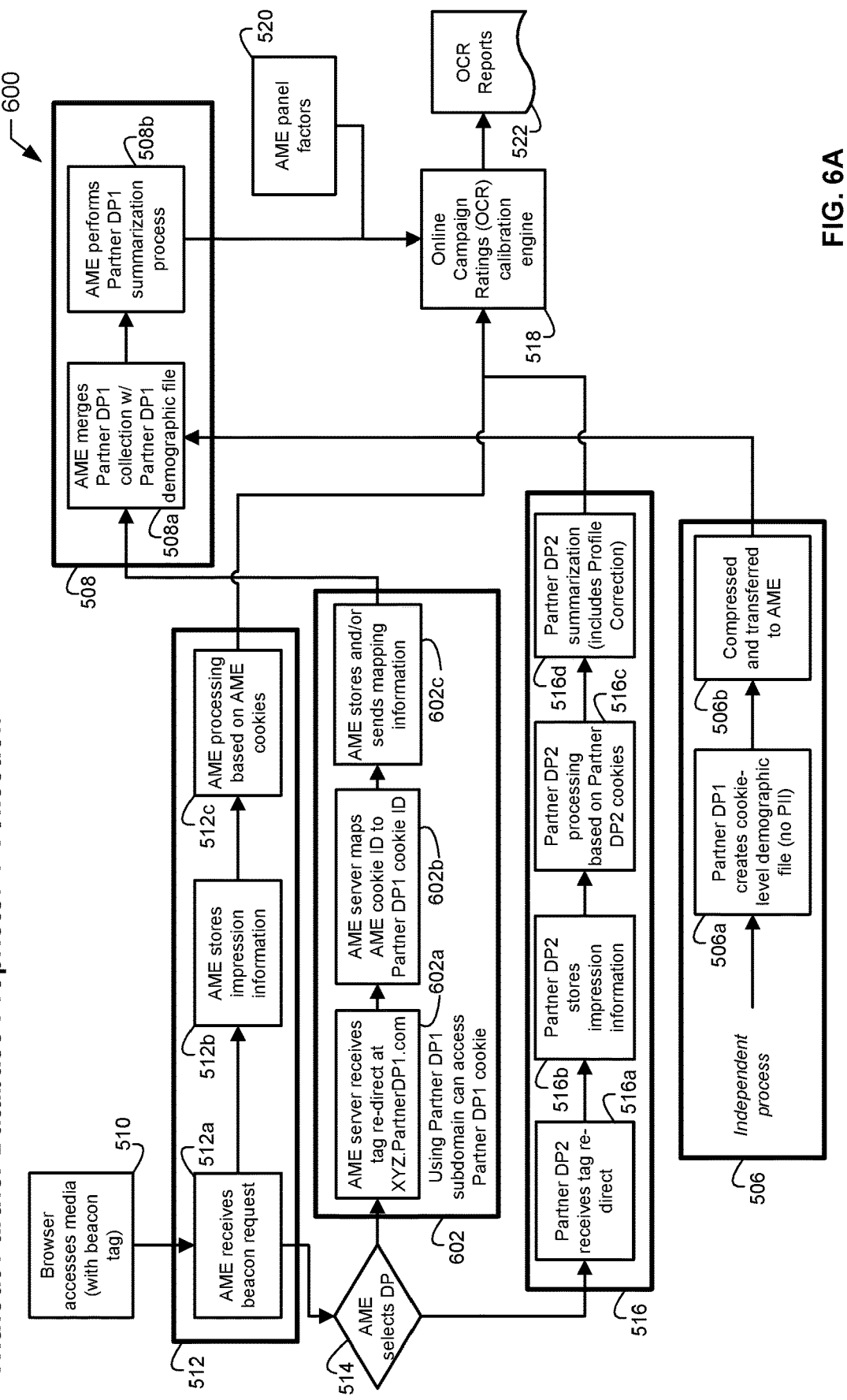
FIG. 6A is a flow diagram representative of example machine readable instructions that may be executed to collect distributed demographic information from first and second partner database proprietors without an OCR collection process to collect OCR data from the first partner DP.
Figure 6B:
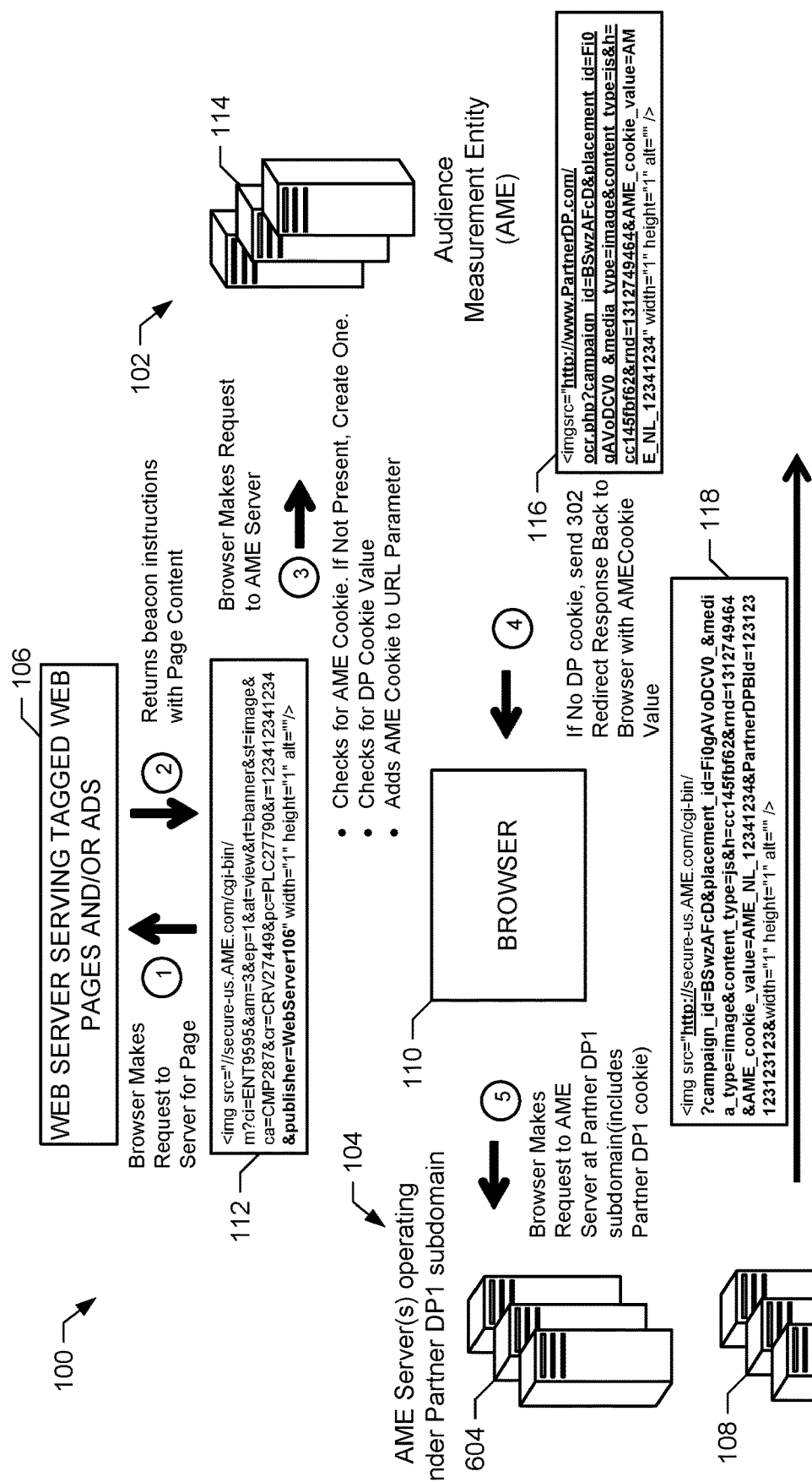
FIG. 6B illustrates an example process of the system of FIG. 1 implementing the instructions of FIG. 6A.

FIG. 6A is a flow diagram representative of example machine readable instructions 600 that may be executed to collect distributed demographic information from first and second partner database proprietors without collecting impression data at the first partner DP. FIG. 6B illustrates an example process of the system 100 of FIG. 1 implementing the instructions 600 of FIG. 6A. The example instructions 600 include blocks 506-522 of FIG. 5A (e.g., arrows (1)-(4) of FIG. 6B). Unlike the instructions 500 of FIG. 5A, the example instructions 600 cause the AME to collect impression information and frees the partner DP1 from the task of collecting impression information.

The example instructions 600 of FIG. 6A include instructions referred to by reference numeral 602, which cause the AME to re-direct the browser to a subdomain of the partner DP1 domain (e.g., a server of the AME of FIG. 1 operating under a subdomain of the partner DP1 domain such as an AME server 604, rather than to a server operated by DP1). An example manner to use a subdomain of the partner DP1 domain is described in U.S. patent application Ser. No. 13/239,005, filed Sep. 21, 2011, which is incorporated by reference in its entirety. The example AME server 604 receives the tag re-direct from the browser at the partner DP1 subdomain address (block 602a) (arrow (5) of FIG. 6B). Because it operates under the partner DP1 subdomain, the example AME can directly receive the partner DP1 cookie from browsers. The partner DP1 cookie is merged or mapped to the AME cookie by the AME (e.g., by retrieving the AME cookie from the payload in the re-direct request) (block 602b). Thus, in FIG. 6A, the partner DP1 is relieved of responsibility for collecting and reporting impression or exposure data. The data collected by the AME via the AME server in the DP1 subdomain may be used by the same or different AME server at block 508 to merge the impression data with demographic data transmitted at block 506. The example AME server 604 stores and/or sends the mapping information to another AME server 114 (e.g., arrow (6) of FIG. 6B).

Figure 7A:
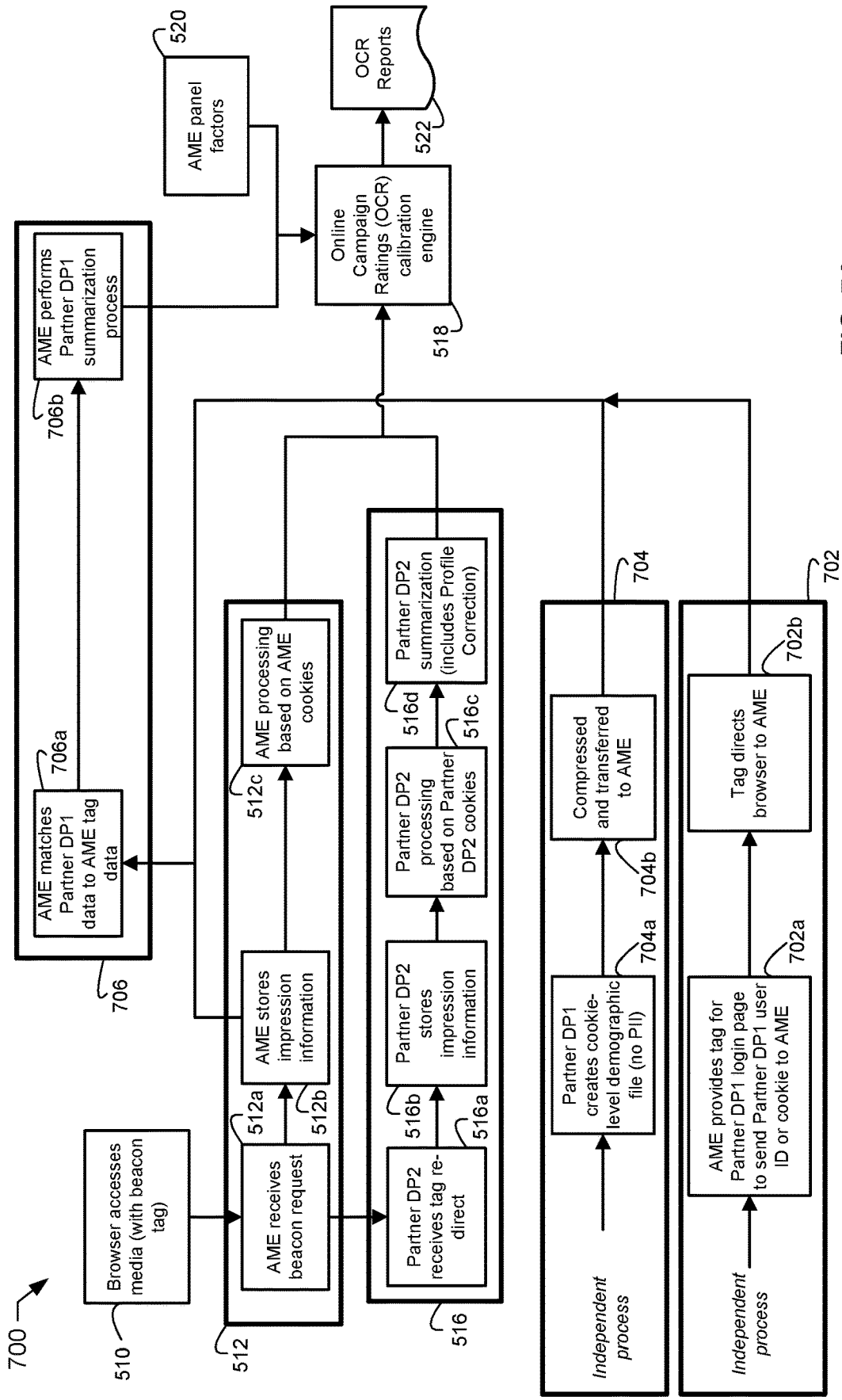
FIG. 7A is a flow diagram representative of example machine readable instructions that may be executed to perform a user-level cookie synchronization process.
Figure 7B:
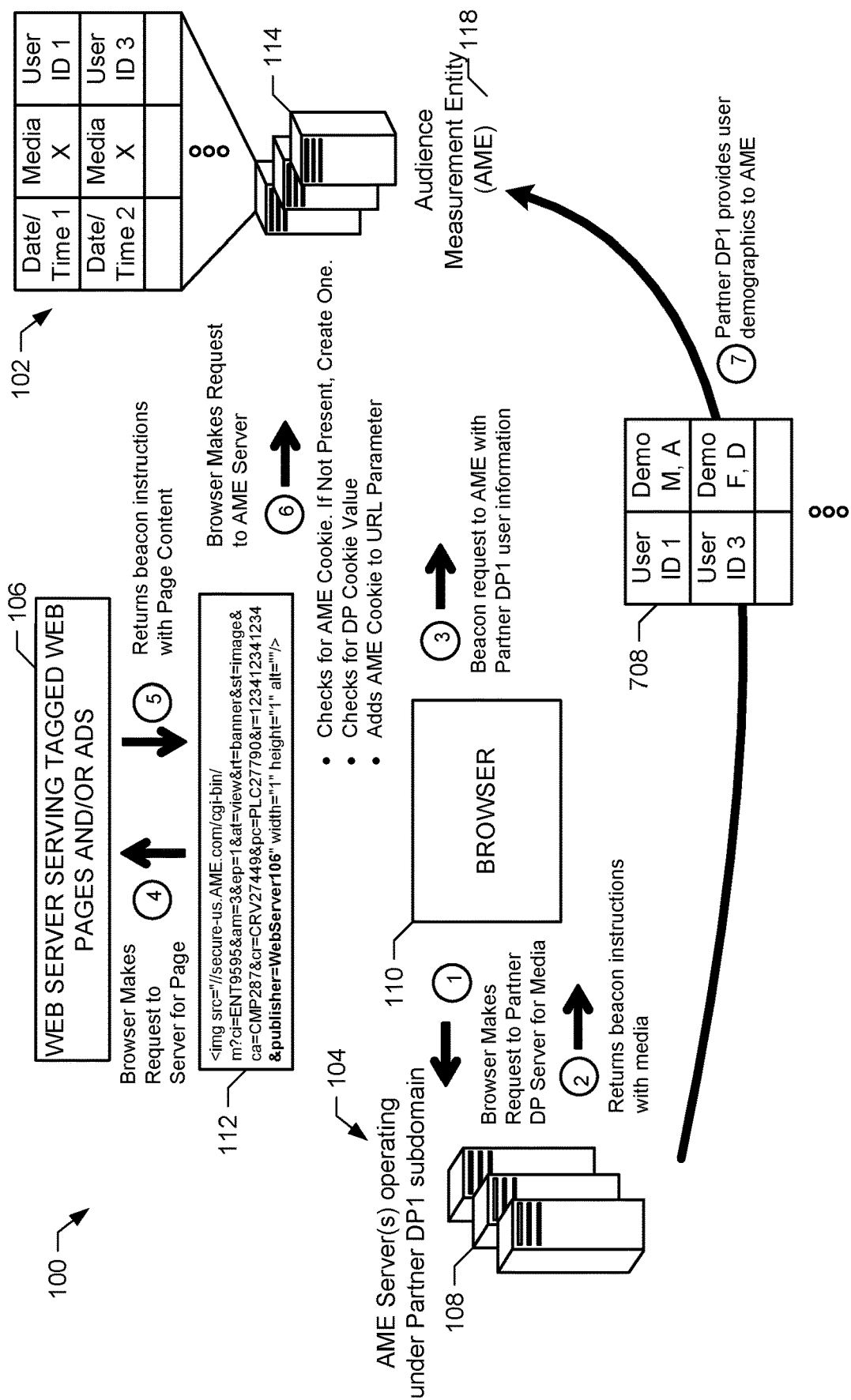
FIG. 7B illustrates an example process of the system of FIG. 1 implementing the instructions of FIG. 7A.

FIG. 7A is a flow diagram representative of example machine readable instructions 700 that may be executed to perform a user-level cookie synchronization process. FIG. 7B illustrates an example process of the system 100 of FIG. 1 implementing the instructions 700 of FIG. 7A. A user-level cookie synchronization refers to synchronizing an AME cookie associated with a user/device with a partner DP cookie associated with the same user/device. The example instructions 700 include blocks 510, 512, and 516-522 of FIG. 5A.

During a collection process 702, media of the partner DP1 site is tagged to allow user cookie IDs to be mapped to AME cookies (block 702a). For example, when a registered user of the partner DP1 site accesses the partner DP1 site (e.g., by accessing a tagged login page) (arrow (1) of FIG. 7B), the tag associated with the partner DPI site (arrow (2) of FIG. 7B) causes the browser to send a beacon request to the AME including an AME cookie (if available) and a user identifier (e.g., an alphanumeric code or value) of the user that is also known to the partner DPI (block 702b). For example, the user identifier may be carried in the payload of the beacon request. To maintain privacy of the user, the example user identifier may be arbitrarily defined by the example partner DP1 and/or may be changed for the same user for each mapping of an AME cookie to a partner DP1 cookie. Moreover, the user identifier is mapped to the DP1 cookie but is not itself the DP1 cookie. The example AME stores an association between the user identifier and the received AME cookie. If there is no received AME cookie, the example AME stores a new AME cookie at the browser and records an association between the new AME cookie and the user identifier. In some examples in which the partner DP1 provides a consistent user identifier for a user, the AME associates multiple AME cookies and the impression data corresponding to the multiple AME cookies based on the AME cookies being mapped to a same partner DP1 cookie.

Separately from the mapping process 702, the example browser 110 accesses media (e.g., from the media server) at block 510 (arrow (4) of FIG. 7B). As described above, the example AME collects and stores impression information received from the browser via the beacon request (e.g., block 512, arrows (5) and (6) of FIG. 7B).

During a demographics process 704, the partner DP1 generates a daily/weekly partner DP1 demographic table (e.g., table 708 of FIG. 7B) containing user IDs (e.g., the user IDs sent via beacon requests to the AME) and key demographic segments (block 704a). The example partner DP1 compresses and/or transfers the demographic file to the AME (e.g., block 704b, arrow (7) of FIG. 7B). Because the partner DP1 is aware of the association between its users and the user IDs provided to the AME, the example partner DP1 can match the user IDs to the demographic information of the corresponding users. In the illustrated example, the partner DP1 anonymizes the data to comply with privacy requirements. The mappings between the user (e.g., partner DP1) IDs and the AME cookies (e.g., as determined by the AME from the data provided by block 702) and the partner DP1 demographic tables (e.g., the demographic file provided by the partner DP1) may be used to create a mapping file between AME cookies and partner DP1 cookies. The cookie mapping and/or the mapping between the user IDs and the AME cookies are subsequently used to associate audience demographics corresponding to online media impressions and/or to perform, for example, online campaign and/or exposure calculations and reporting. In the illustrated example, the AME applies profile corrections to correct or adjust any demographic data deemed to be inaccurate.

During a reporting process 706, the partner DP1 demographic tables (e.g., received from process block 704) are matched to AME collection tables (e.g., tables of impression information collected by the AME in process block 512) (block 706a) for summarization and reporting (block 706b). For example, the AME matches the demographic data corresponding to partner DP1 cookies (e.g., received from process block 704 of FIG. 7A and/or arrow (7) of FIG. 7B) to activity monitoring data using the partner DP1 cookie to AME cookie mappings (e.g., received and/or determined from process block 702 of FIG. 7A and/or arrow (3) of FIG. 7B). In this manner, demographic data is joined with impression data based on AME cookie IDs and/or user identifiers provided by the DP1 to associate demographic data with activity data. The demographic and activity data may then be fed into a calibration engine for generation of reports reflecting exposure to various demographic groups.

The example instructions 700 of FIG. 7A do not cause the browser to re-direct to the DP1 servers. Instead, the cookie mapping between the partner DP1 cookie (and/or the partner DP1 user identifier) and the AME cookie enables the impression data collected by the AME to be mapped to demographic information provided by the partner DP1. As a result, the number of re-directions is reduced relative to the systems of FIGS. 5A-5B, 6A-6B, and 8A-8B and, thus, network traffic is reduced. Further, the reduced re-direction of the browser results in an improved experience for the user because the user experiences fewer delays associated with re-direct messages.

Figure 8A:
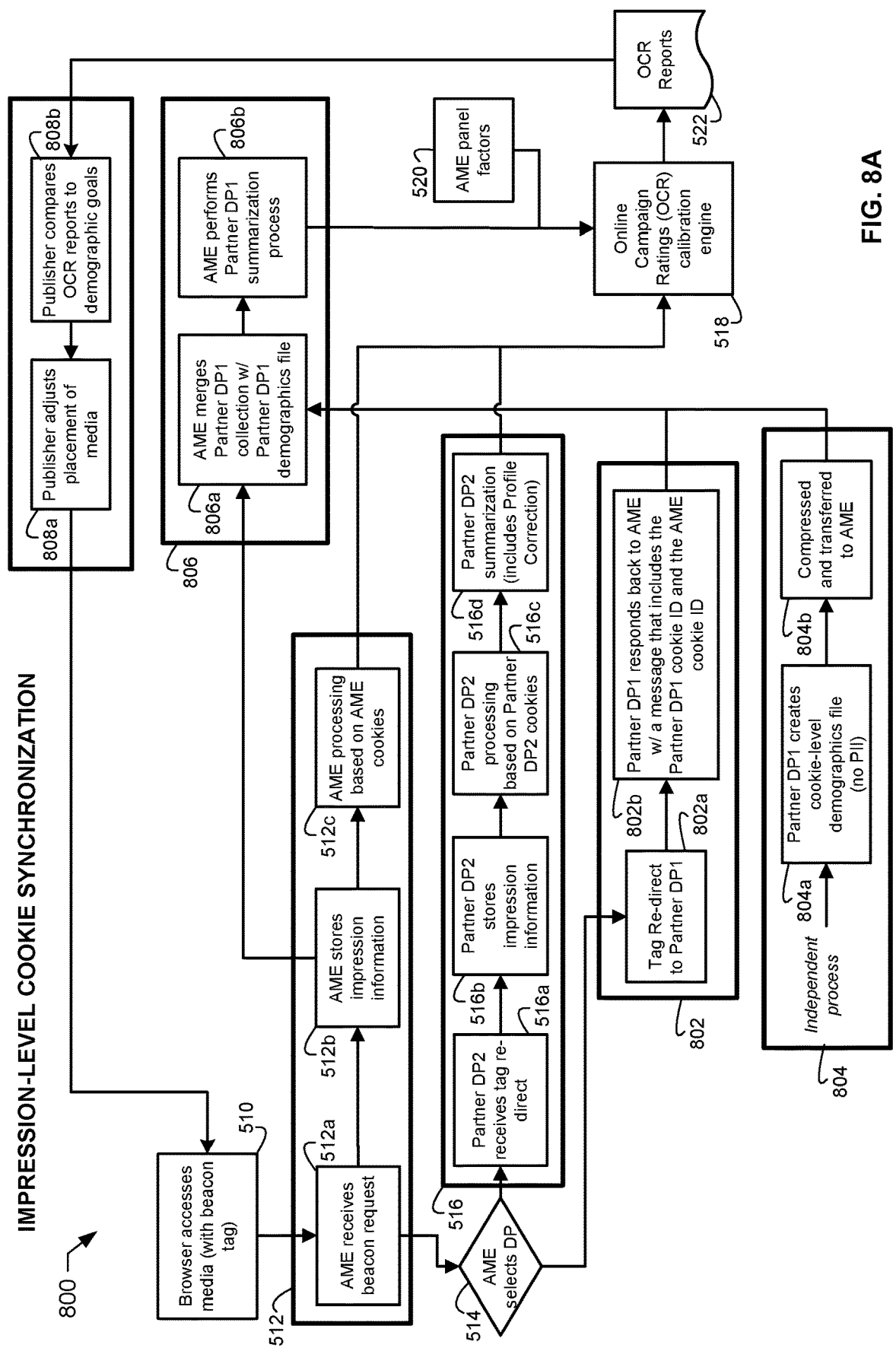
FIG. 8A is a flow diagram representative of example machine readable instructions that may be executed to perform an impression-level cookie synchronization process.
Figure 8B:
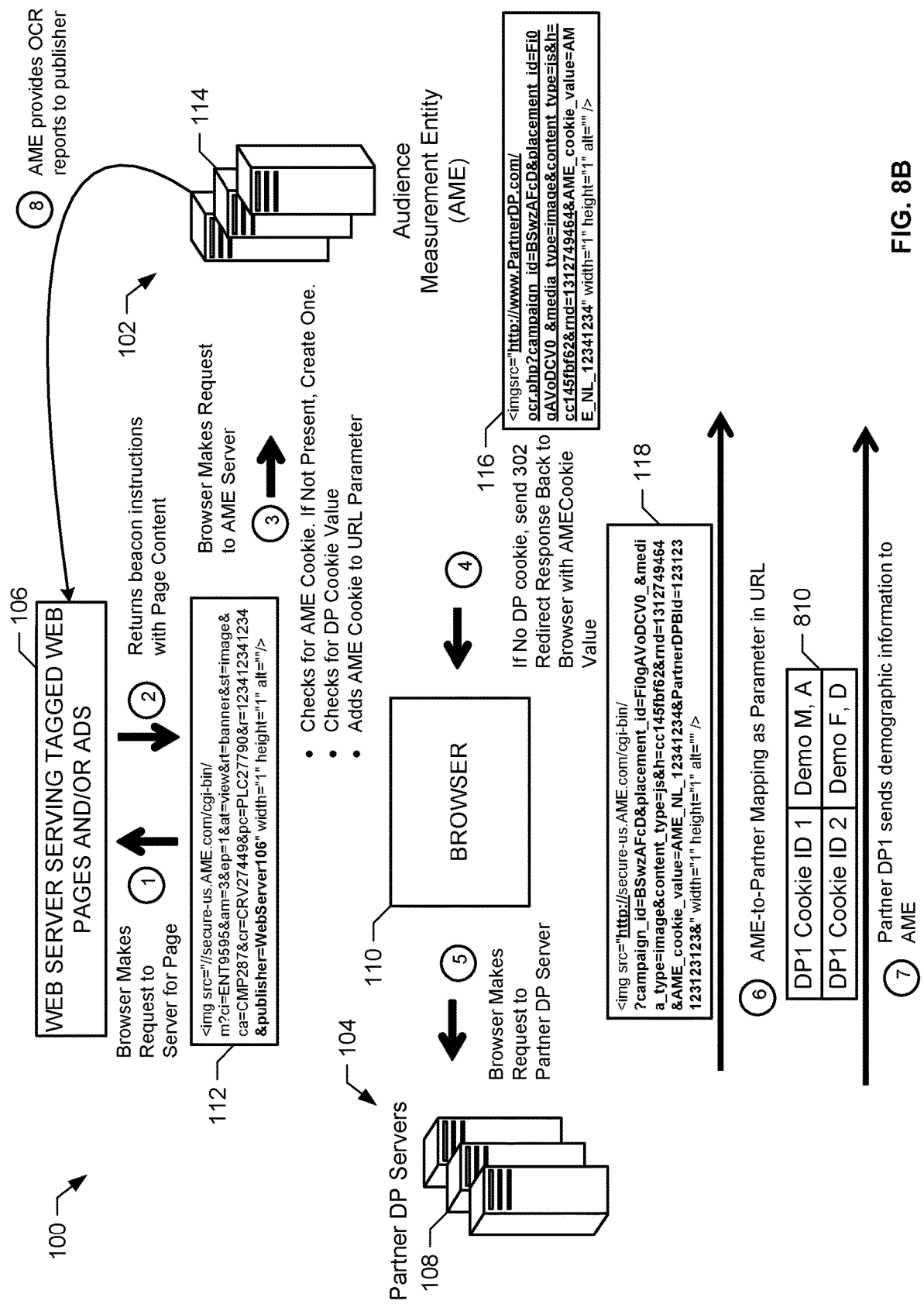
FIG. 8B illustrates an example process of the system of FIG. 1 implementing the instructions of FIG. 8A.

FIG. 8A is a flow diagram representative of example machine readable instructions 800 that may be executed to perform an impression-level cookie synchronization process. FIG. 8B illustrates an example process of the system 100 of FIG. 1 implementing the instructions 800 of FIG. 8A. An impression-level cookie synchronization refers to synchronizing an AME cookie associated with an impression with a partner DP cookie also associated with that same impression. The example instructions 600 include blocks 510-522 of FIG. 5A, which implements at least arrows (1)-(4) of FIG. 8B.

During a collection process 802, the partner DP1 receives a re-direct from a client browser (e.g., block 802a of FIG. 8A, arrow (5) of FIG. 8B). The re-direct includes an AME cookie as a parameter (e.g., in the payload of the request) to be transmitted to the partner DP1. The partner DP1 receives the re-directed request from the client browser and automatically returns a response containing a mapping between the AME cookie ID (provided by the AME via the re-direct) and the partner DPI cookie ID (received from the client browser when present) (block 802b, arrow (6) of FIG. 8B). In some examples, the response is sent to the client browser, which forwards the data to the AME. In other examples, a response is sent directly (e.g., omitting the browser) to the AME (e.g., via an asynchronous communication) from the partner DP1 to avoid additional messages involving the client browser that can reduce the user experience. The example cookie mapping during collection process 802 results in rapid collection of demographic information (e.g., collection that approaches real-time), enabling advertisers to more quickly identify discrepancies between advertising goals and advertising results and/or to more quickly adjust placement and/or service of advertisements in order to reach the desired demographic composition.

For example, if an ad publisher intends to place ads on web sites A and B to achieve 10,000 impressions per day with men, ages 30-40 but, instead, the data collection by the process of FIG. 8A shows that web site A is producing 6,000 impressions for men, ages 30-40, and web site A is producing mostly female impressions, the ad publisher can increase the ad placement on web site B and decrease the ad placement on web site A within the time period associated with the demographic goal (e.g., a seven day period to meet a daily goal, an hour period to meet an hourly goal, etc.) to achieve its demographic impression goals. This switch in ad placements may potentially be done in real time to achieve the desired advertising goals in a current ad campaign. In the past, the demographic results were not available until after the ad campaign was completed, thereby resulting in missed goals.

The partner DP1 periodically (e.g., hourly, daily, weekly, biweekly, monthly, etc.) or aperiodically (e.g., with the mapping information) provides a user table (e.g., table 810 of FIG. 8B) or other data structure to the AME containing partner DP1 cookie identifiers and key demographic segments (block 804a, arrow (6) and/or arrow (7) of FIG. 8B). The cookie identifiers provided in the user table correspond to the cookie identifiers mapped to the AME identifiers in process block 802. In the illustrated example, the data is made anonymous (e.g., personally identifying information is removed) to comply with privacy requirements. In the illustrated example, the AME applies profile corrections to correct or adjust any demographic data deemed to be inaccurate.

During a reporting process 806, the example AME uses the mapping received from block 802 to match partner DP1 demographic tables (e.g., demographic data from block 804) to AME collection tables (e.g., online activity data from block 512) (block 806a) for summarization and reporting (block 806b). For example, summarization of the data may include grouping impression information and/or demographic information into larger demographic groups rather than providing impression and/or demographic information for individual users and/or individual cookies. In this manner, demographic data is joined to impression data based on partner DP1 cookie IDs.

In operations within process block 808, the example AME provides the OCR reports 522 of FIG. 8A to the media publisher and/or web server (e.g., arrow (8) to the web server 106 of FIG. 8B). In the example of FIG. 8A, the publisher compares the OCR reports to demographic goals (block 808a). Based on the comparison, the example publisher adjusts the placement of the media (e.g., shifts the placement of the media among web sites) to achieve the desired goals. Thus, block 808 provides a feedback mechanism to enable advertisers to identify discrepancies between advertising goals and advertising results and/or to more quickly adjust placement and/or service of advertisements in order to reach the desired demographic composition.

While example instructions 500-800 are disclosed above with reference to FIGS. 5A-8B, any of the instructions 500-800 and/or blocks of FIGS. 5A-8B may be combined, divided, re-arranged, omitted, eliminated and/or implemented in any other way to achieve various advantages such as those described with respect to FIGS. 5A-8B.

While an example manner of implementing the systems 100, 300 are illustrated in FIGS. 1-4, 5B, 6B, 7B, and/or 8B, one or more of the elements, processes and/or devices illustrated in FIGS. 1-4, 5B, 6B, 7B, and/or 8B may be combined, divided, re-arranged, omitted, eliminated and/or implemented in any other way. Further, the example web server 106, the example AME server(s) 114, 604 the example partner DP servers 108, 304, the example browser 110, the example beacon request re-director 120, the example cookie generator 122, the example partner selector 124, the example beacon instruction generator 126, the example communications interfaces 128, 132, the example cookie mapper 130 and/or, more generally, the example systems 100, 300 of FIGS. 1-4, 5B, 6B, 7B, and/or 8B may be implemented by hardware, software, firmware and/or any combination of hardware, software and/or firmware. Thus, for example, any of the example web server 106, the example AME server(s) 114, 604 the example partner DP servers 108, 304, the example browser 110, the example beacon request re-director 120, the example cookie generator 122, the example partner selector 124, the example beacon instruction generator 126, the example communications interfaces 128, 132, the example cookie mapper 130 and/or, more generally, the example systems 100, 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example web server 106, the example AME server(s) 114, 604 the example partner DP servers 108, 304, the example browser 110, the example beacon request re-director 120, the example cookie generator 122, the example partner selector 124, the example beacon instruction generator 126, the example communications interfaces 128, 132, and/or the example cookie mapper 130 is/are hereby expressly defined to include a tangible computer readable storage device or storage disk such as a memory, a digital versatile disk (DVD), a compact disk (CD), a Blu-ray disk, etc. storing the software and/or firmware. Further still, the example systems 100, 300 of FIGS. 1-4, 5B, 6B, 7B, and/or 8B may include one or more elements, processes and/or devices in addition to, or instead of, those illustrated in FIGS. 1-4, 5B, 6B, 7B, and/or 8B, and/or may include more than one of any or all of the illustrated elements, processes and devices.

Flowcharts representative of example machine readable instructions for implementing the systems 100, 300 of FIGS. 1-4, 5B, 6B, 7B, and/or 8B are shown in FIGS. 9-13. In this example, the machine readable instructions comprise programs for execution by a processor such as the processor 1412 shown in the example processor platform 1400 discussed below in connection with FIG. 14. The programs may be embodied in software stored on a tangible computer readable storage medium such as a CD-ROM, a floppy disk, a hard drive, a digital versatile disk (DVD), a Blu-ray disk, or a memory associated with the processor 1412, but the entire programs and/or parts thereof could alternatively be executed by a device other than the processor 1412 and/or embodied in firmware or dedicated hardware. Further, although the example programs are described with reference to the flowcharts illustrated in FIGS. 9-13, many other methods of implementing the example systems 100, 300 may alternatively be used. For example, the order of execution of the blocks may be changed, and/or some of the blocks described may be changed, eliminated, or combined.

As mentioned above, the example processes of FIGS. 9-13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 9-13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 9:
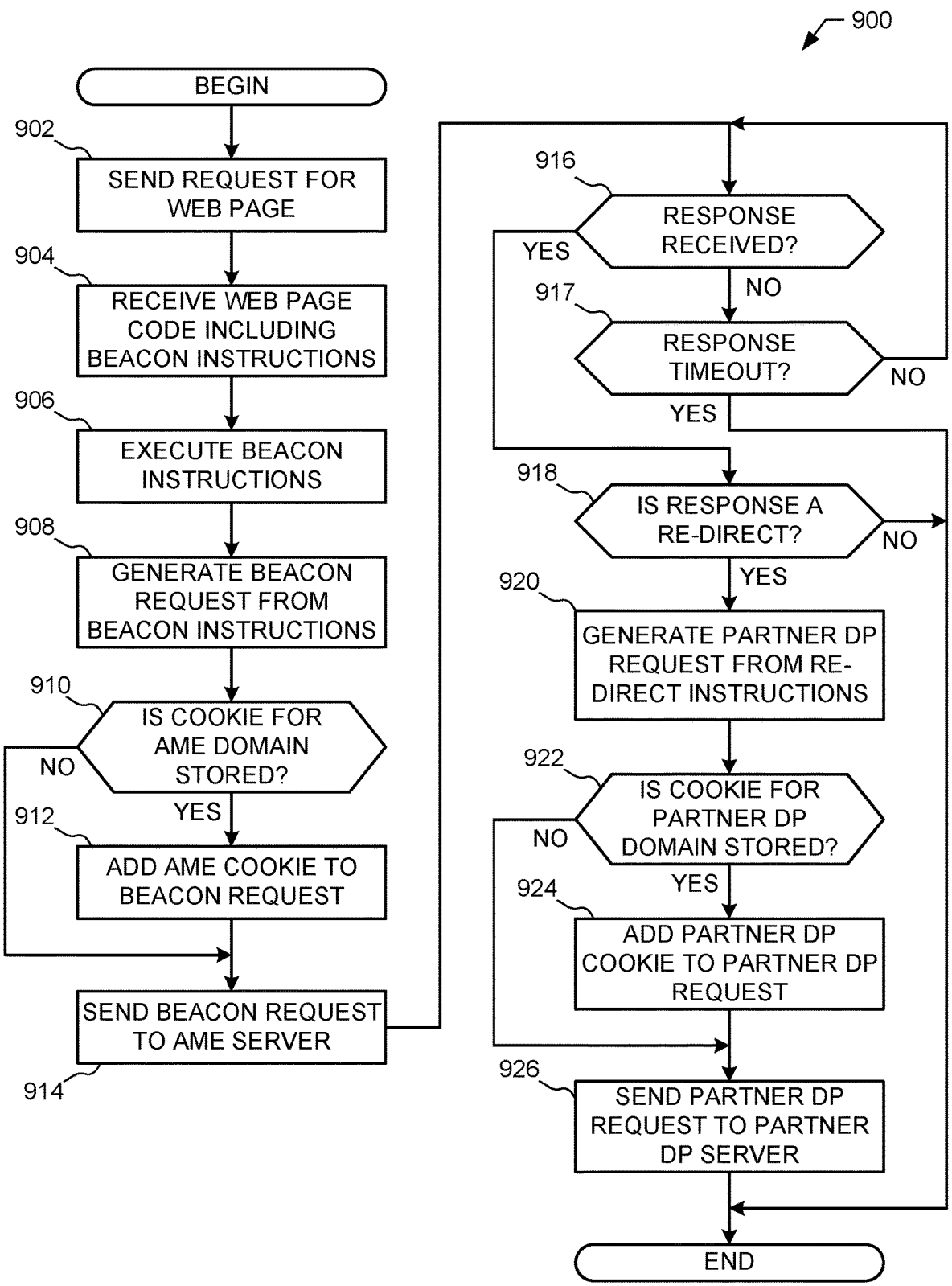
FIG. 9 is a flowchart representative of example machine readable instructions that may be executed to implement the example browser of FIGS. 1-4, 5B, 6B, 7B, and/or 8B to implement mapping of an AME cookie to partner DP cookies for the browser.

FIG. 9 is a flowchart representative of example machine readable instructions 900 that may be executed to implement the example browser 110 of FIGS. 1-4, 5B, 6B, 7B, and/or 8B to implement mapping of an AME cookie to partner DP cookies for the browser.

The example browser 110 of FIG. 1 sends a request for a web page (e.g., to a partner DP and/or to another web page publisher) (block 902). The example browser 110 receives web page code including beacon instructions (e.g., a tag provided by the AME) (block 904). The example browser 110 executes the beacon instructions (block 906) and generates a beacon request from the beacon instructions (block 908).

The example browser 110 determines whether a cookie for the AME domain is stored (block 910). For example, the AME may have caused the browser 110 to previously store a cookie for the AME domain. If a cookie for the AME domain is stored (block 910), the example browser 110 adds the AME cookie to the beacon request (block 912). After adding the AME cookie to the beacon request (block 912), or if there is no cookie stored for the AME domain (block 910), the example browser 110 sends the beacon request to the AME server 114 (block 914). Example methods and apparatus for performing any of blocks 902-914 are described in U.S. Pat. No. 8,370,489, the entirety of which is incorporated by reference as though fully set forth herein.

The example browser 110 determines whether a response has been received (block 916). If a response has not been received (block 916), the example browser 110 determines whether a response timeout (e.g., a watchdog timer) has lapsed (block 917). For example, when the browser 110 provides an AME cookie in the beacon request, and the AME server 114 determines that the AME cookie is mapped to a partner DP cookie, the example AME server 114 may log the impression and omit transmission of a response to the browser 110. By not responding, the example AME server 114 and browser 110 may reduce the amount of network traffic and/or reduce an amount of data being sent to the partner DPs. If the response timeout has not occurred (block 917), control loops to block 916 to continue waiting for a response to the beacon request. In some examples, a timer is used at block 916 to prevent hanging up in an infinite loop. In such examples, if no response is received within a time out period, control jumps out of block 916 to end the instructions of FIG. 9.

When a response is received (block 916), the example browser 110 determines whether the response is a re-direct message (e.g., a 302FOUND message) (block 918). If the response is a re-direct message (block 918), the example browser 110 generates a partner DP request from the re-direct instructions (block 920). For example, the partner DP request may include a URL of a partner DP server specified in the re-direct message.

The example browser 110 determines whether a cookie for the partner DP domain specified in the re-direct is stored (block 922). For example, the partner DP may have caused the browser 110 to previously store a cookie for the partner DP domain. If there is a cookie for the partner DP domain stored (block 922), the example browser adds the partner DP cookie to the partner DP request (block 924). After adding the partner DP cookie (block 924), or if no partner DP cookie is stored (block 922), the example browser 110 sends the partner DP request to the partner DP server 108 (block 926). After sending the partner DP request to the partner DP server (block 926), if the response from the AME server 114 is not a re-direct (e.g., is a placeholder image such as a 1×1 transparent pixel) (block 918), or if a response timeout occurs (block 917), the example instructions 900 end.

Figure 10:
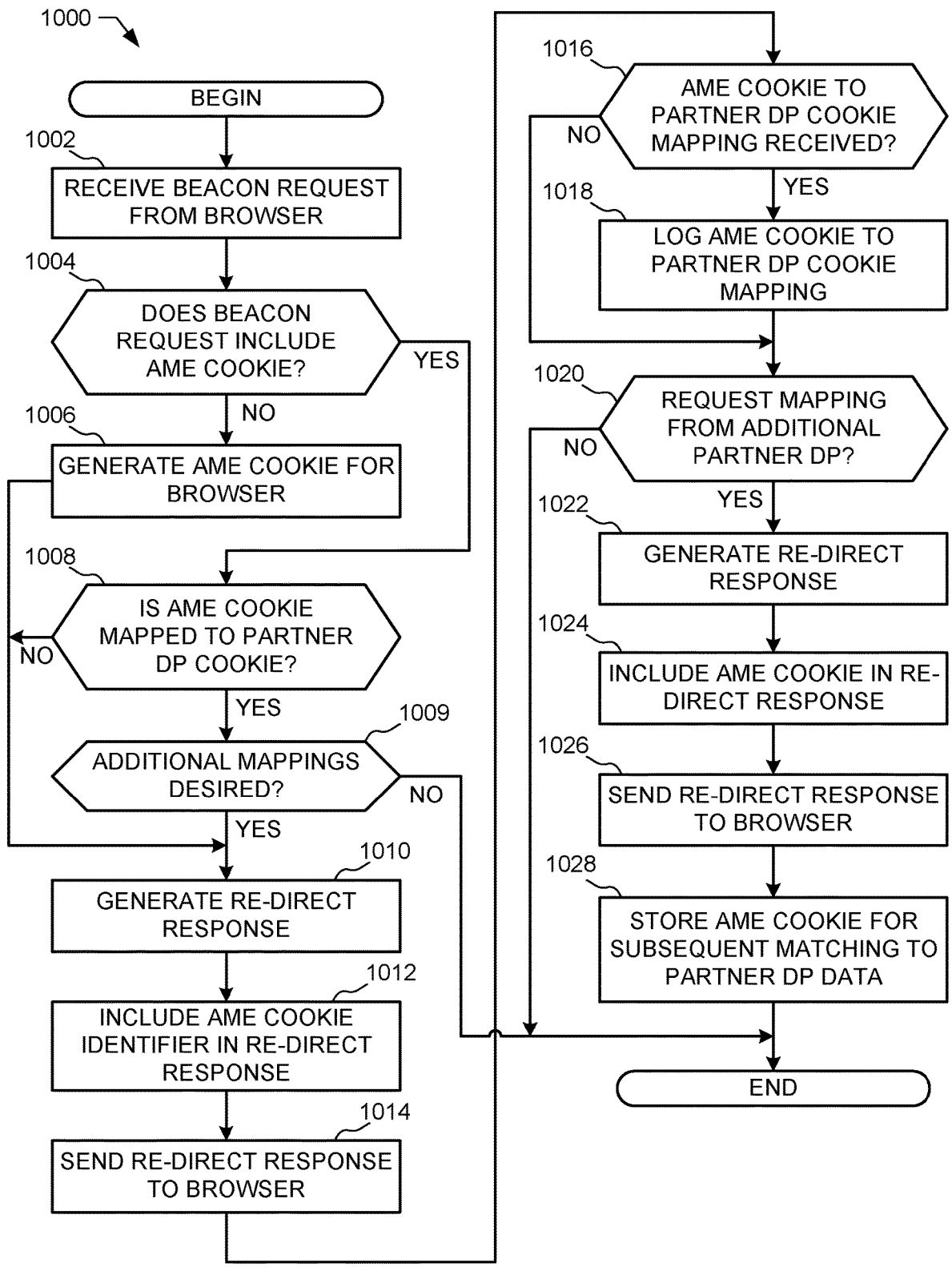
FIG. 10 is a flowchart representative of example machine readable instructions that may be executed to implement the example AME server of FIGS. 1-4, 5B, 6B, 7B, and/or 8B to initiate mapping of an AME cookie to partner DP cookies.

FIG. 10 is a flowchart representative of example machine readable instructions 1000 that may be executed to implement the example AME server 114 of FIGS. 1-4, 5B, 6B, 7B, and/or 8B to initiate mapping of an AME cookie to partner DP cookies.

The example AME server 114 of FIG. 1 receives a beacon request from a browser (e.g., the browser 110 of FIG. 1) (block 1002). The example AME server 114 determine whether the beacon request includes an AME cookie (block 1004). If the beacon request does not include an AME cookie (block 1004), the example AME server 114 generates an AME cookie for the browser (block 1006). For example, the AME cookie enables the AME server to track the online activity of the browser in AME-tagged web pages. If the beacon request includes an AME cookie (block 1004), the example AME server 114 determines whether the AME cookie is already mapped to a partner DP cookie (block 1008). For example, the AME server 114 may determine whether the AME cookie is mapped to a cookie of one or more partner DPs. If the AME cookie is mapped to a partner DP cookie (block 1008), the example AME server 114 determines whether an additional mapping is desired (block 1009). For example, while the AME server 114 may have a mapping between the AME cookie and a first partner DP cookie, it may be desirable to map the AME cookie to second (or more) partner DP cookies from other partner DPs to improve the quality of demographic information applied to the impression data.

If a mapping of the AME cookie to a partner DP cookie (e.g., a first partner DP cookie and/or an additional partner DP cookie) is desired (blocks 1008, 1009), or after generating the AME cookie (block 1006), the example AME server 114 generates a re-direct response (block 1010). The example AME server 114 includes an identifier of the AME cookie (e.g., the generated or previously-stored cookie) and an address (e.g., a URL) of a partner DP to be contacted in the re-direct response (block 1012). The example AME server 114 sends the re-direct response (e.g., including the AME cookie identifier and the partner DP address) to the browser 110 (block 1014). In some examples, blocks 1002-1014 represent a process and blocks 1016-1030 represent a separate process executing in parallel. In such examples, the first process ends after block 1014.

Returning to the example of FIG. 10, the example AME server 114 determines whether an AME cookie to partner DP cookie mapping has been received (block 1016). The example AME server 114 may wait for a time period between blocks 1014 and 1016 (e.g., to allow the browser 110 to send the request to the partner DP server 108). If an AME cookie to partner DP cookie mapping is received (block 1016), the example AME server 114 logs the AME cookie to partner DP cookie mapping (block 1018). For example, the mapping may include the AME cookie identifier and a corresponding partner DP cookie identifier.

In some examples, blocks 1016 and 1018 constitute a thread that may be executed as a separate process to receive and/or store mappings between AME cookies and partner DP cookies. For example, the AME server 114 may re-direct browsers to partner DP servers 108, 304. The partner DP servers 108, 304 determine the associations between the AME cookies and the partner DP cookies and, instead of immediately transmitting the mappings to the AME server 114 (e.g., directly or via the browser 110), the example partner DP servers 108, 304 process and/or transmit the mappings as a batch (e.g., multiple messages, multiple mappings in a file, etc.).

Returning to the example of FIG. 10, after logging the cookie mapping (block 1018), or if no cookie mapping is received (block 1016), the example AME server 114 determines whether to request a mapping from an additional partner DP (block 1020). For example, the browser 110 may select multiple beacon requests based on the tagging instructions to enable the AME server 114 to re-direct requests to multiple partner DPs. If the AME server 114 is to request mapping from an additional partner DP (block 1020), the example AME server 114 generates a re-direct response (block 1022). The example AME server 114 includes an AME cookie (e.g., the generated or received AME cookie) in the re-direct response (block 1024). The example AME server 114 sends the re-direct request to the browser 110 (block 1026).

In some examples in which the AME server 114 is to request mappings from additional (e.g., multiple) partner DPs (block 1020), the example AME server 114 may issue multiple re-direct responses to the browser 110 simultaneously in response to the beacon request.

Returning to the example of FIG. 10, the example AME server 114 stores the AME cookie for subsequent matching to partner DP data (e.g., via periodic transmission of partner DP OCR and/or demographic information) (block 1028).

After storing the AME cookie (block 1028), if the AME server 114 is not to request mapping from an additional partner DP (block 1020), or if cookie mappings to additional partner DPs are not desired (block 1009), the example instructions 1000 of FIG. 10 end.

Figure 11:
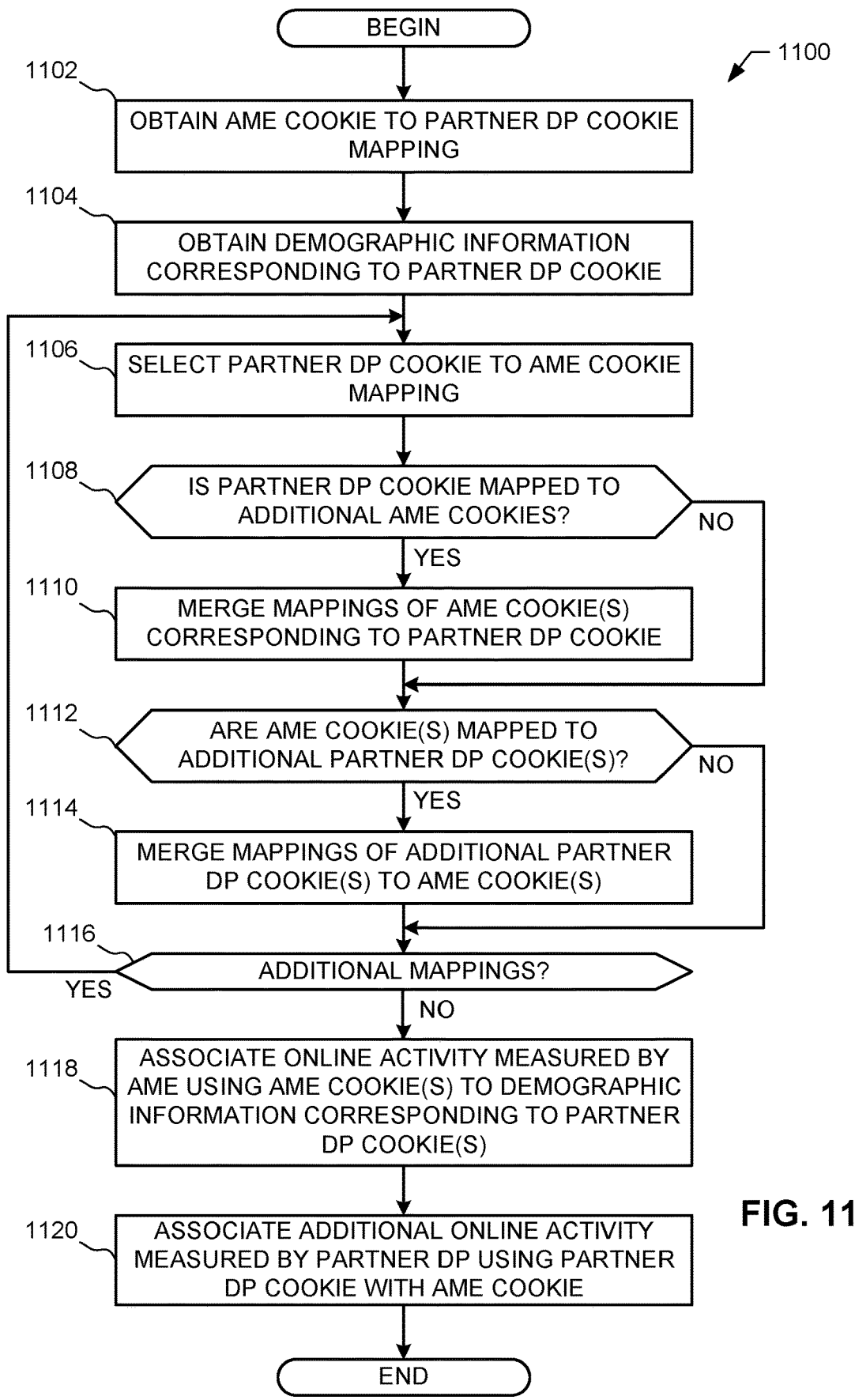
FIG. 11 is a flowchart representative of example machine readable instructions that may be executed to implement the example AME server of FIGS. 1-4, 5B, 6B, 7B, and/or 8B to associate demographics obtained from a partner DP to online activity monitoring information.

FIG. 11 is a flowchart representative of example machine readable instructions 1100 that may be executed to implement the example AME server 114 of FIGS. 1-4, 5B, 6B, 7B, and/or 8B to associate demographics obtained from a partner DP with online activity monitoring information (e.g., impression data and/or exposure data).

The example AME server 114 obtains an AME cookie to partner DP cookie mapping (block 1102). For example, the AME server 114 may receive a periodic or aperiodic report including mappings of AME cookies to partner DP cookies from the partner DP server 108 of FIG. 1. Additionally or alternatively, the example AME server 114 may receive messages (e.g., HTTP messages) from partner DP servers 108, 304 (e.g., directly or via the browser 110) that include the AME cookie to partner DP cookie mappings. The example AME server 114 obtains demographic information corresponding to the partner DP cookie(s) (block 1104).

The example AME server 114 selects an AME cookie to partner DP cookie mapping (block 1106). The example AME server 114 determines whether the partner DP cookie in the selected mapping is mapped to additional AME cookies (e.g., AME cookies other than the AME cookie in the selected mapping) (block 1108). For example, multiple AME cookies may be provided to the browser 110 that is associated with one user, who is in turn associated with one partner DP cookie. As the AME cookies expire or get deleted by the browser 110, additional AME cookies are provided to the browser 110 and may be mapped to the same partner DP cookie. The example AME server 114 may then correlate the impressions for the user by merging impression data for multiple AME cookies that are mapped to a same partner DP cookie. If the partner DP cookie is mapped to additional AME cookies (block 1108), the example AME server merges the mappings of AME cookie(s) corresponding to the partner DP cookie (block 1110). By merging the mappings, the example AME server 114 can merge the activities (e.g., impressions) of the user associated with the browser.

After merging the mappings (block 1110) or if the partner DP cookie is not mapped to additional AME cookies (block 1108), the example AME server 114 determines whether the AME cookie(s) (e.g., the AME cookie of the selected mapping and/or the merged AME cookie(s)) are mapped to additional partner DP cookie(s) (block 1112). For example, the AME server 114 may request and receive mappings from multiple partner DP servers 108, 304 for a single AME cookie as described above. If the AME cookie(s) are mapped to additional partner DP cookie(s) (block 1112), the example AME server 114 merges the mappings of the additional partner DP cookies to the AME cookie(s) (block 1114).

After merging the mappings (block 1114), or if there are no additional partner DP cookies mapped to the AME cookies (block 1112), the example AME server 114 determines whether there are additional mappings to be considered for merging (block 1116). If there are additional mappings (block 1116), control returns to block 1106 to select another AME cookie to partner DP cookie mapping.

When there are no additional mappings (block 1116), the example AME server 114 associates online activity (e.g., impression data) measured with the AME cookies to received demographic information corresponding to partner DP cookies (e.g., based on the merged or unmerged mappings of the AME cookies to the partner DP cookies) (block 1118). For example, the AME server 114 may match the impression data measured in associated with an AME cookie with the demographic data received in association with a partner DP cookie by determining the mapping of the AME cookie to the partner DP cookie. The example AME server 114 associates with the AME cookie any additional online activity that was measured by the partner DP using the partner DP cookie (block 1120). As a result, the example AME server 114 aggregates the online activity (if any) measured by the AME with online activity measured by the partner DP that was not measured by the AME, which is further associated with demographic information provided by the partner DP that was not previously available to the AME. The example instructions 1100 then end.

Figure 12:
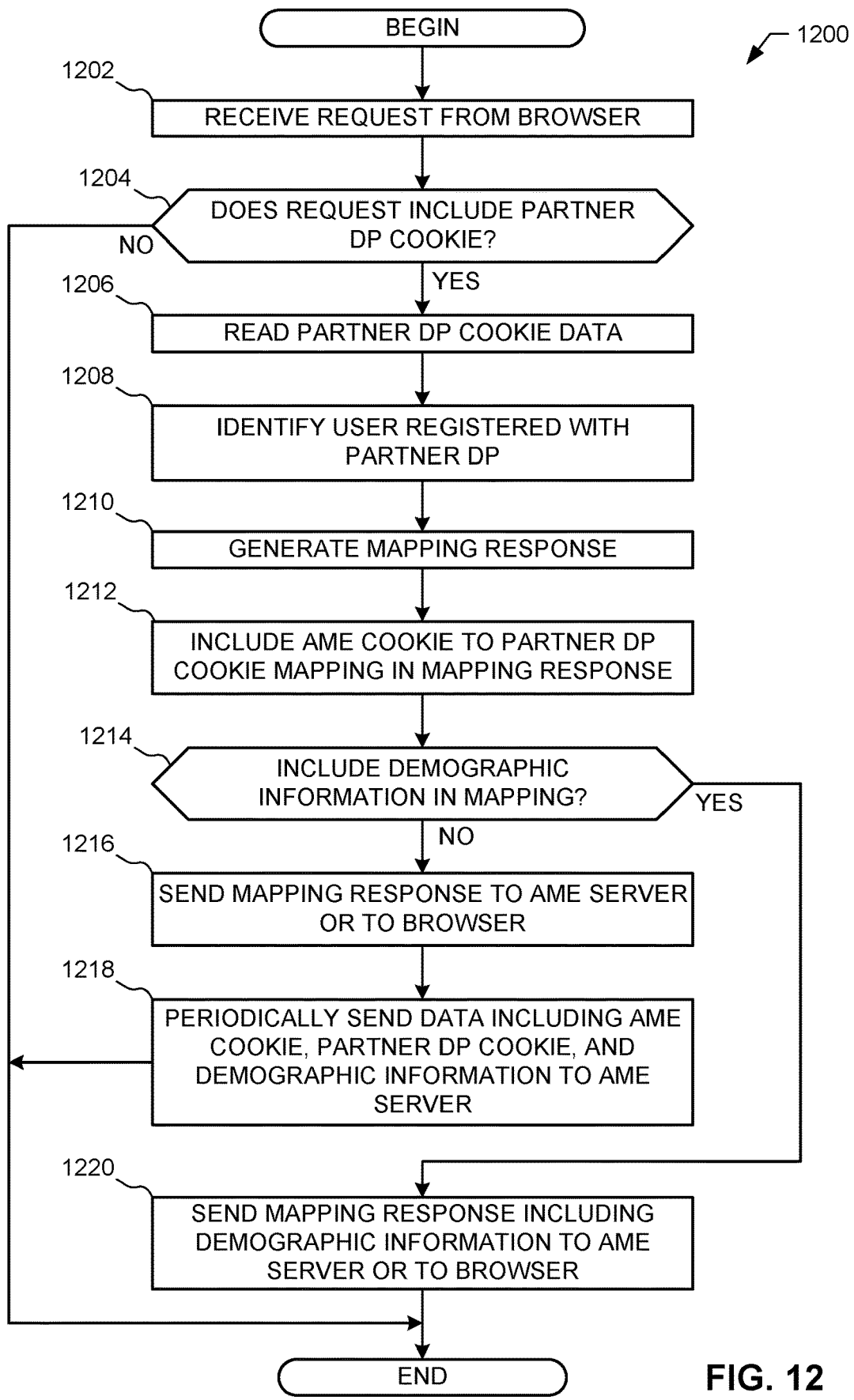
FIG. 12 is a flowchart representative of example machine readable instructions that may be executed to implement the example partner DP servers of FIGS. 1-4, 5B, 6B, 7B, and/or 8B to map an AME cookie to a partner DP cookie.

FIG. 12 is a flowchart representative of example machine readable instructions 1200 that may be executed to implement the example partner DP servers 108, 304 of FIGS. 1-4, 5B, 6B, 7B, and/or 8B to map an AME cookie to a partner DP cookie. For clarity, the example instructions 1200 of FIG. 12 are described below with reference to the example partner DP server 108.

The example partner DP server 108 of FIG. 1 receives a request from a browser (e.g., the browser 110 of FIG. 1) (block 1202). The example partner DP server 108 determines whether the request includes a partner DP cookie (block 1204). For example, if a user of the browser 110 had previously set up an account or otherwise provided information to the partner DP, the example partner DP may have stored a cookie on a computer executing the browser 110.

If the request includes a partner DP cookie (block 1204), the example partner DP server 108 reads the partner DP cookie data (block 1206). For example, the partner DP server 108 may determine a user identifier or other identifying information from the partner DP cookie data. The example partner DP server 108 then identifies the user registered with the partner DP based on the cookie (block 1208).

The example partner DP server 108 generates a mapping response (block 1210). The partner DP server 108 includes an AME cookie to partner DP cookie mapping in the mapping response (block 1212). For example, the partner DP server 108 may include a URL including the domain of the AME server 114, an identifier of the AME cookie, and an identifier of the partner DP cookie mapped to the AME cookie in the mapping response. The example partner DP server 108 determines whether to include demographic information corresponding to the partner DP cookie in the mapping (block 1214). For example, the partner DP server 108 may provide the demographic information with the mapping and/or may provide demographic information to the AME 102 on a periodic basis.

If the partner DP server 108 is not to include demographic information in the mapping (block 1214), the example partner DP server 108 sends a mapping response to the AME server 114 or to the browser 110 (block 1216). For example, the partner DP server 108 may send an asynchronous HTTP request to the AME server 114 and/or send a re-direct response to the browser 110 to cause the browser to send a request to the AME server 114. The example partner DP server 108 periodically sends data including the AME cookie, the partner DP cookie, and demographic information to the AME server 114 (block 1218). However, the partner DP server 108 may additionally or alternative send the data to the AME server 114 at aperiodic or other intervals. If the partner DP server 108 is to include the demographic information (block 1214), the example partner DP server 108 sends a mapping response including demographic information to the AME server 114 or to the browser 110 (block 1220).

After sending the mapping response including the demographic information (block 1220) or after sending the mapping response and sending the demographic data separately (blocks 1216 and 1218), the example instructions of FIG. 12 end.

Figure 13:
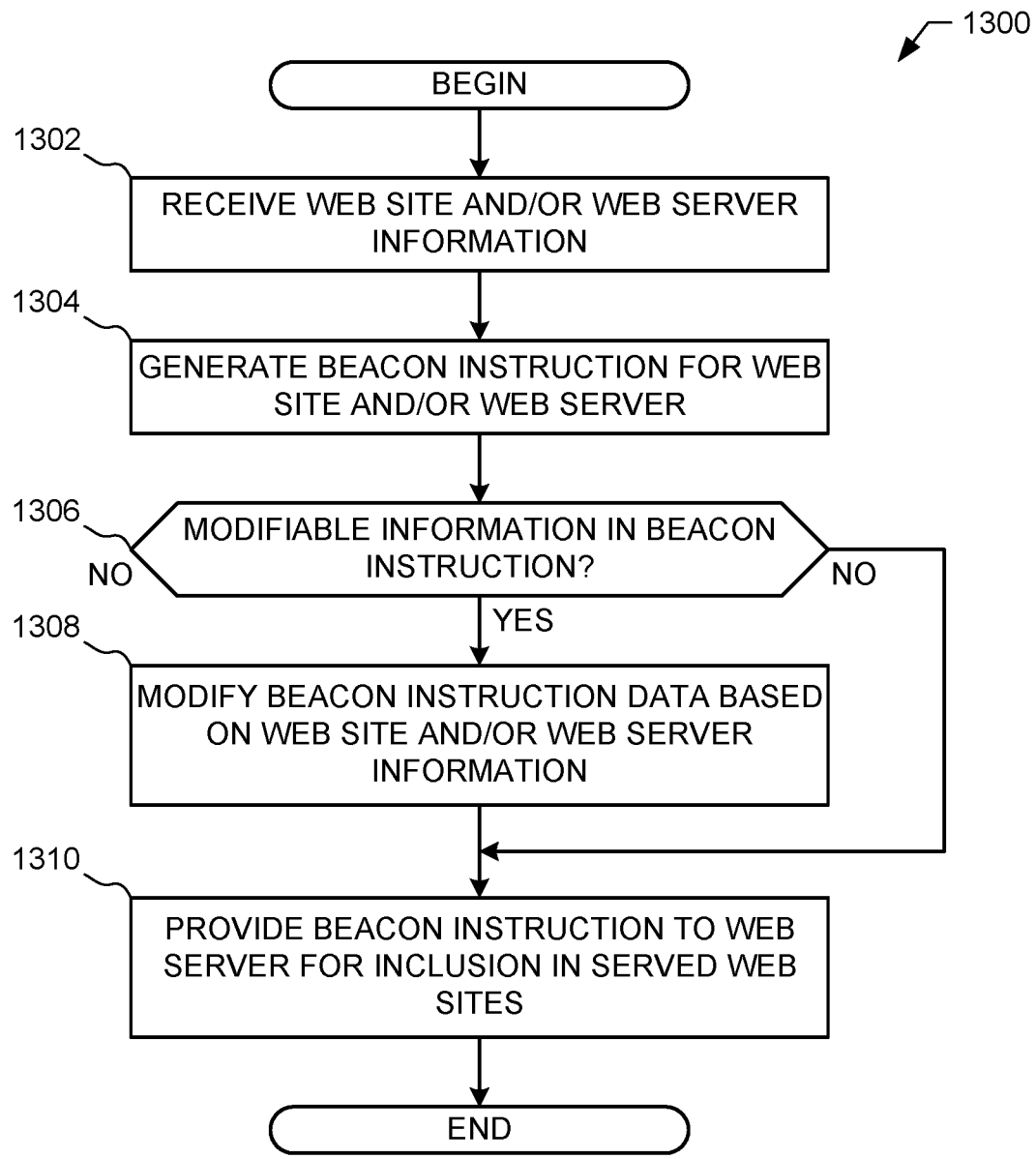
FIG. 13 is a flowchart representative of example machine readable instructions which may be executed to implement the example beacon instruction generator of FIG. 1 to generate beacon instructions (e.g., tags) to be served by a web server (e.g., the web server of FIG. 1).

FIG. 13 is a flowchart representative of example machine readable instructions 1300 which may be executed to implement the example beacon instruction generator 126 of FIG. 1 to generate beacon instructions (e.g., tags) to be served by a web server (e.g., the web server 106 of FIG. 1) to tag media (e.g., an advertisement, a web page, etc.).

The example beacon instruction generator 126 of FIG. 1 receives web site and/or web server information (e.g., address information, information describing the web sites served by the web server 106 of FIG. 1) (block 1302). The example beacon instruction generator 126 generates beacon instruction(s) for the web site and/or the web server (block 1304). In some examples, the beacon instruction generator 126 generates a template instruction for a web site and/or web site element (e.g., for an entire web site, for an advertisement or other media that is part of a web site, etc.). The example beacon instruction generated by the beacon instruction generator 126 causes a browser or other client device that receives the beacon instruction to initiate beacon requests to facilitate impression measurement and/or a process that results in mapping an AME cookie to one or more partner DP cookies as disclosed herein.

The example beacon instruction generator 126 determines whether the beacon instruction includes modifiable (e.g., customizable) data (block 1306). Example modifiable data may be include in the beacon instruction to customize the beacon instruction for a web site, a web server, an ad campaign, or other purpose. Example information that may be configured as unmodifiable includes an address of the AME server 114 to which the beacon instruction is to initiate a communication. If there is modifiable information in the beacon instruction (block 1306), the example beacon instruction generator 126 modifies the modifiable beacon instruction data based on the web site and/or web server information (block 1308).

In some examples, the beacon instruction includes data that is modifiable by the web server 106 based on the web page being served to the browser 110. For example, the beacon instruction may provide different data to the example browser 110 depending on the identity of the user of the browser 110 and/or a timestamp of sending the beacon instruction.

After modifying the beacon instruction data (block 1308), or if the beacon instruction is not modifiable (block 1306), the example beacon instruction generator 126 provides the beacon instruction to the web server 106 for inclusion in media (block 1310). For example, the beacon instruction generator 126 may transmit the beacon instruction to the web server 106 via a communications interface and/or provide the instruction to a developer or administrator of the web site for inclusion in the script and/or code of the web server 106. The example instructions 1300 then end and/or iterate to generate additional beacon instructions for the web server 106 or additional web servers.

Figure 14:
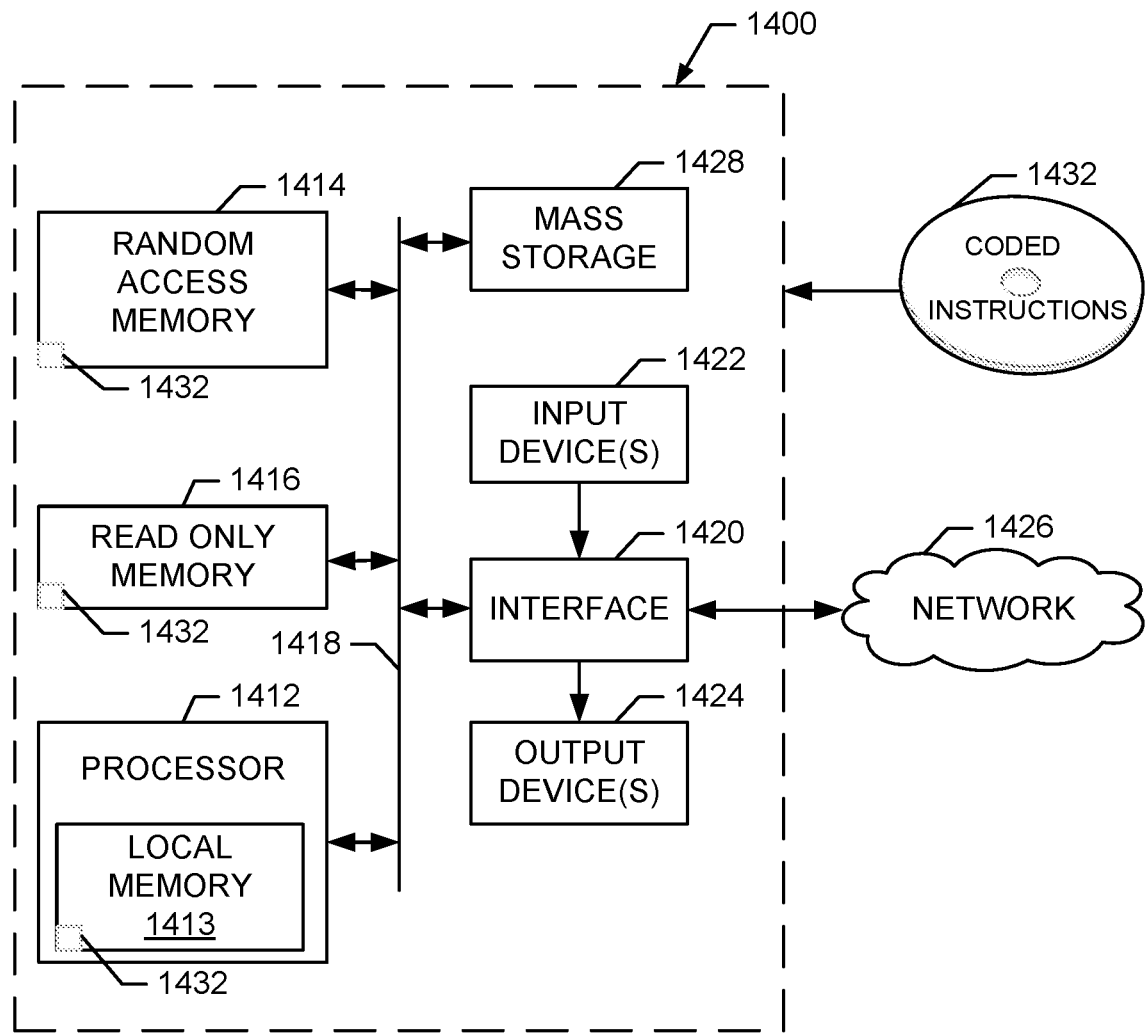
FIG. 14 is an example processor system that may be used to execute the example instructions of FIGS. 5A-13 to implement example apparatus and systems disclosed herein.

FIG. 14 is a block diagram of an example processor platform 1400 capable of executing the instructions of FIGS.

9-13 to implement the example AME server(s) 114, the example partner DP servers 108, 304, the example browser 110 and/or, more generally, the example systems 100, 300 of FIGS. 1-4, 5B, 6B, 7B, and/or 8B. The processor platform 1400 can be, for example, a server, a personal computer, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a PCI express interface, and/or any other communications interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 9-13 may be stored in the mass storage device 1428, in the volatile memory 1414, in the non-volatile memory 1416, and/or on a removable tangible computer readable storage medium such as a CD or DVD.

Example methods and apparatus disclosed herein provide demographic information to audience measurement entities for larger numbers of online users than were previously available to audience measurement entities. Example methods and apparatus disclosed herein reduce the uncertainty associated with the use of statistical methods by increasing the amounts of collected data, while maintaining privacy for individual users. Example methods and apparatus disclosed herein reduce a number of re-directs needed to database proprietors during the life or validity of the associated cookies. By reducing the number of re-directs, example methods and apparatus disclosed herein reduce interruptions, interference, and/or background processing that can negatively affect performance of client browsers, thus, improving an overall user experience for audience members. Example methods and apparatus improve overall efficiencies of networking environments by reducing network congestion and delay associated with collecting matching exposure information to demographic information.

It is noted that this patent claims priority from Australian Patent Application Serial Number 2013204865, which was filed on Apr. 12, 2013, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a communications interface; and
a processor to generate instructions to be included in a web site and to cause the communications interface to provide the instructions to a web server associated with the web site, the instructions to cause a client device, upon execution of the instructions, to initiate a process comprising:
sending a first request to an audience measurement entity;
receiving a re-direct message from the audience measurement entity, the re-direct message including an identifier of an audience measurement entity cookie; and
sending a second request to cause a database proprietor to send to the audience measurement entity a cookie mapping of the audience measurement entity cookie to a database proprietor cookie corresponding to the client device, the audience measurement entity cookie set in the client device by a first server corresponding to the audience measurement entity, the database proprietor cookie set in the client device by a second server corresponding to the database proprietor.

2. An apparatus as defined in claim 1, wherein the communications interface is to receive information associated with the web site, the processor to generate the instructions based on the information.

3. An apparatus as defined in claim 1, wherein the communication interface is to send the audience measurement entity cookie in the first request.

4. An apparatus as defined in claim 1, wherein the second request is further to cause the database proprietor to send to the audience measurement entity a demographic characteristic associated with the client device.

5. An apparatus as defined in claim 1, wherein the instructions are further to cause the client device to:
  send a third request to the audience measurement entity; and
  send a fourth request to a second database proprietor to cause the second database proprietor to send to the audience measurement entity a second cookie mapping of the audience measurement entity cookie to a second database proprietor cookie, the second database proprietor cookie corresponding to the second database proprietor.

6. An apparatus as defined in claim 1, wherein the second request is to cause the database proprietor to send the cookie mapping to the audience measurement entity asynchronously.

7. A method, comprising:
  providing, via a communication interface, instructions to be included in a web site, the instructions to cause a client device, upon execution of the instructions, to initiate a process comprising:
    sending a first request to an audience measurement entity;
    receiving a re-direct message from the audience measurement entity, the re-direct message including an identifier of an audience measurement entity cookie; and
    sending a second request to cause a database proprietor to send to the audience measurement entity a cookie mapping of the audience measurement entity cookie to a database proprietor cookie corresponding to the client device, the audience measurement entity cookie set in the client device by a first server corresponding to the audience measurement entity, the database proprietor cookie set in the client device by a second server corresponding to the database proprietor.

8. A method as defined in claim 7, further including receiving information associated with the web site and generating the instructions based on the information.

9. A method as defined in claim 7, wherein the instructions are further to cause the client device to send the audience measurement entity cookie in the first request.

10. A method as defined in claim 7, wherein the second request is further to cause the database proprietor to send to the audience measurement entity a demographic characteristic associated with the client device.

11. A method as defined in claim 7, wherein the instructions to cause the client device to:
  send a third request to the audience measurement entity; and
  send a fourth request to a second database proprietor to cause the second database proprietor to send to the audience measurement entity a second cookie mapping of the audience measurement entity cookie to a second database proprietor cookie, the second database proprietor cookie corresponding to the second database proprietor.

12. A method as defined in claim 7, wherein the second request is to cause the database proprietor to send the cookie mapping to the audience measurement entity asynchronously.

13. A non-transitory computer readable storage medium comprising computer readable instructions which, when executed, cause a client device to at least:
  send a first request to an audience measurement entity;
  receive a re-direct message from the audience measurement entity, the re-direct message including an identifier of an audience measurement entity cookie; and
  send a second request to cause a database proprietor to send to the audience measurement entity a cookie mapping of the audience measurement entity cookie to a database proprietor cookie corresponding to the client device, the audience measurement entity cookie set in the client device by a first server corresponding to the audience measurement entity, the database proprietor cookie set in the client device by a second server corresponding to the database proprietor.

14. A storage medium as defined in claim 13, wherein the instructions are embedded in a website accessed via the client device.

15. A storage medium as defined in claim 13, wherein the instructions are further to cause the client device to send the audience measurement entity cookie in the first request.

16. A storage medium as defined in claim 13, wherein the second request is further to cause the database proprietor to send to the audience measurement entity a demographic characteristic associated with the client device.

17. A storage medium as defined in claim 13, wherein the instructions are further to cause the client device to:
  send a third request to the audience measurement entity; and
  send a fourth request to a second database proprietor to cause the second database proprietor to send to the audience measurement entity a second cookie mapping of the audience measurement entity cookie to a second database proprietor cookie, the second database proprietor cookie corresponding to the second database proprietor.

18. A storage medium as defined in claim 13, wherein the second request is to cause the database proprietor to send the cookie mapping to the audience measurement entity asynchronously.

* * * * *